United States Patent [19]

Maeda et al.

[11] Patent Number: 4,860,183
[45] Date of Patent: Aug. 22, 1989

[54] PLANAR LINEAR PULSE MOTOR

[75] Inventors: Tetsuo Maeda, Mishima; Hirofumi Ohta, Otokuni; Hirokuni Inazumi, Kyoto, all of Japan

[73] Assignee: Omron Tateisi Electronics Co., Kyoto, Japan

[21] Appl. No.: 936,242

[22] Filed: Dec. 1, 1986

[30] Foreign Application Priority Data

Jan. 14, 1986 [JP] Japan .................................. 61-5655

[51] Int. Cl.⁴ .......................................... H02K 41/00
[52] U.S. Cl. ...................................... 363/12; 318/135
[58] Field of Search ................................ 310/12-14; 318/135

[56] References Cited

U.S. PATENT DOCUMENTS

| 4,504,750 | 3/1985 | Onodera | 310/12 |
| 4,578,622 | 3/1986 | Nakagawa | 310/12 X |
| 4,709,175 | 11/1987 | Nakagawa | 310/12 |

FOREIGN PATENT DOCUMENTS

| 0046670 | 3/1982 | Japan | 310/12 |
| 3338864 | 4/1984 | Japan | |

OTHER PUBLICATIONS

*IBM Tech. Disclosure Bulletin,* Thompson, "Linear Incremental Motor", 2/64, pp. 19-20, vol. 6, No. 9.
Patent Abstracts of Japan, vol. 9, No. 270 (E-353), & JP-A-60 113 652 (Shinko Denki), 6/20/85.
Patent Abstracts of Japan, vol. 10, No. 104 (E-397), & JP-A-60 241 767 (Shinko Denki), 11/30/85.

*Primary Examiner*—Patrick R. Salce
*Assistant Examiner*—Judson H. Jones
*Attorney, Agent, or Firm*—Wegner & Bretschneider

[57] ABSTRACT

In this planar linear pulse motor, first and second assemblies are mutually movable along an axial line. The first assembly includes a group of teeth which are arranged at a determinate pitch in a row along a line parallel to this axial line, each of these teeth being elongated in a direction perpendicular to the axial line. The second assembly includes four groups of teeth, each such group being arranged at the same determinate pitch also in a row along a line parallel to the axial line, with the phases of the four groups of teeth being offset from one another, and with each of these teeth also being elongated in a direction perpendicular to the axial line. The four groups of teeth of this second assembly each confront the group of teeth of the first assembly in parallel and are separated from those teeth by a relatively small gap. One of a pair of magnetic core members is contiguous to one side surface of a permanent magnet which has opposite magnetic poles on its side surfaces on either side of its central longitudinal line, and the other of this pair of magnetic core members is contiguous to the other magnetic pole side surface of this permanent magnet. Each of these magnetic core members has two pole surfaces contiguous to two of the four groups of teeth of this second assembly. For each of the magnetic core members, there is provided a coil for inducing magnetic flux in it.

24 Claims, 13 Drawing Sheets

PLANAR LINEAR PULSE MOTOR

BACKGROUND OF THE INVENTION

The present invention relates to a planar linear pulse motor, and more particularly relates to a planar linear pulse motor, of a type which is suitable for application for driving the movement of the magnetic head or heads in a floppy disk drive of a word porcessor or a personal computer or the like, which is improved in terms of thinness, overall size, assemblability, manufacturability, mountability, operational accuracy, and speed of operation.

In the prior art, especially with regard to application to a floppy disk drive of a word processor or a personal computer or the like, there have been proposed various types of linear pulse motor; a cylindrical type of linear pulse motor is typically used. In Japanese Utility Model Laying Open Publication Serial No. 58-97759 (1983), which it is not intended hereby to admit as prior art to the present patent application except to the extent in any case required by applicable law, and a typical figure of which publication is shown in FIG. 4 of the accompanying drawings in a sectional view longitudinal from the point of view of its direction of moving operation, there is disclosed a cylindrical linear pulse motor comprising a stationary hollow cylindrical housing member 6 formed with a set of magnetic pole teeth denoted as 61 on its inner cylindrical surface, and a movable member 7 is slidably supported on a guide shaft 62, which extends substantially along the central axis of said cylindrical housing member 6, by a bearing construction 71 incorporating a bearing bush 72. This movable member 7 is formed with magnetic pole teeth 73 on its outer cylindrical surface, which cooperate with the magnetic pole teeth 61 of the cylindrical housing member 6 to linearly drive the movable member 7, according to suitable and selective magnetization of the movable member 7 in a per se known manner.

However, such a conventional type of cylindrical linear pulse motor is fraught with the disadvantage of a large external diameter, because of the necessarily coaxial disposition of the guide shaft 62, the bearing construction 71 and its bush 72, and the magnetic pole teeth 73 and 61 and the cylindrical housing member 6; and, further, it is difficult to raise the production efficiency of such a conventional type of cylindrical linear pulse motor to a realistically high level, because the magnetic pole teeth 61 of the cylindrical housing member 6 and the magnetic pole teeth 73 of the movable member 7 must be formed by machining using a machine tool. Further, the accuracy for assembly required is also very high, which imposes a time and cost penalty. Accordingly the cost of the finished cylindrical linear pulse motor is inevitably higher than desirable.

Further, in Japanese Patent Laying Open Publication Serial No. 59-89565 (1983), which again it is not intended hereby to admit as prior art to the present patent application except to the extent in any case required by applicable law, and typical figures of which publication are shown in FIGS. 8 and 9 of the accompanying drawings, respectively in an exploded perspective view and in a sectional view longitudinal from the point of view of its direction of moving operation, there is disclosed a planar type linear pulse motor comprising a stationary assembly 1 and a planar movable member 5. The stationary assembly 1 and the movable member 5 thereof are mounted so as to be mutually slidable as shown by the arrow "A" in FIG. 8 by a means not particularly shown in the figures. The lower surface (not visible in the figure) of the planar movable member 5 is formed with a series 51 of magnetic pole teeth which are set in series at a pitch of P; and, as before, each of the magnetic pole teeth of this series 51 thereof is continuous from the left side to the right side thereof.

And the stationary assembly 1 comprises a plate shaped permanent magnet 2, having magnetic poles on its opposite side surfaces which are different in polarity but are the same along each said side surface, and extending substantially perpendicular to the direction of sliding motion of the planar movable member 5. A pair of magnetic core members 31a and 31b are provided, each being generally shaped like a letter "C", with central portions thereof denoted respectively as 31c and 31d being narrowed down somewhat and having coils 32a and 32b wound on them. Under the end portions 39a, 39b, 39c, and 39d of these magnetic core members and in the transverse direction there is fixed the permanent magnet 2, for example by bonding. And a back yoke 115 is fixed under the permanent magnet 2 for supporting it. The end portions 39a through 39d of the magnetic core members 31a and 31b are respectively formed directly as magnetic pole teeth portions 42a, 42b, 42c, and 42d with the upper surfaces thereof each being formed with a series of magnetic pole teeth 42a through 42d respectively, each said series being set at the same pitch P, and with the phases of the four series of magnetic pole teeth 42 arranged along the four magnetic pole teeth portions 42a, 42c, 42b, and 42d being staggered apart by a phase difference of P/4 in that order. By appropriately changing the direction of the electric current supplied to the coils 32a and 32b, the four magnetic pole teeth portions 42a, 42c, 42b, and 42d are sequentially magnetized in the one or the other polarity as required, and in cooperation with the magnetic biasing effect provided by the permanent magnet 2 they function to pull the planar movable member 5 along by its teeth 51 relative to the stationary assembly 1 by increments of one quarter of the pitch P of said teeth 51.

However, such a type of planar linear pulse motor is fraught with the disadvantage of an inevitably excessive thickness, because the permanent magnet 2 and the back yoke 115 are layered together over the rear surfaces (the lower surface as seen in FIG. 8) of the magnetic core members 31a and 31b. Particular problems would arise when applying such a type of planar linear pulse motor for driving the movement of the magnetic head or heads in a floppy disk drive of a word processor or a personal computer or the like. For example, as schematically shown in FIG. 9 of the accompanying drawings in longitudinal sectional view, when a mounting structure for such a magnetic head 117 of a floppy disk drive is utilized, since said magnetic head 117 must be supported from the planar movable member 5 of the planar linear pulse motor by way of a mount 118, and since the back yoke 115 and the permanent magnet 2 are layered together against the magnetic core members 31a and 31b, the overall thickness (height H as seen in the figure) of the device from the base 119 on which it is mounted to the floppy disk 120 inserted into the floppy disk drive is inevitably great. In fact, this is one of the major difficulties relating to reducing the thickness of a planar linear pulse motor. Accordingly, low profile design of such a floppy disk drive is well nigh impossible when such a planar linear pulse motor is to be incorporated therein, since the pulse motor itself it relatively thick.

Another problem that arises in connection with the manufacture of such a planar linear pulse motor relates to the assembly thereof. As is for example disclosed in Japanese Patent Laying Open Publication Serial No. 60-113652 (1984), which again it is not intended hereby to admit as prior art to the present patent application except to the extent in any case required by applicable law, a conceivable construction for such a planar linear pulse motor could be for a stationary member or base plate to be provided, and for a permanent magnet and four groups of magnetic pole teeth to be supported on said base plate. And a guide mechanism for the planar movable member of the planar linear pulse motor could be provided, with a prestressing mechanism biasing said guide mechanism against said planar movable member and thus holding said planar movable member in a slidable manner. However, the problem would arise with such a construction that, since the permanent magnet and four groups of magnetic pole teeth would be required to be located on said base plate during manufacture, the positioning of said permanent magnet and said magnetic pole teeth during manufacture of the planar linear pulse motor could be rather difficult.

Conventional linear pulse motors have not typically had any positioning mechanism for mounting them into other equipment. When a linear pulse motor is to be installed into a system such for instance as a floppy head drive for a floppy disk drive for a word processor or a personal computer or the like, the advance shaft for the linear pulse motor and the central rotary shaft of the floppy disk drive must cross each other at right angles, and should any shifting or misalignment develop therebetween reading of information from the floppy disk loaded in the drive would inevitably become impossible. Therefore normally when a linear pulse motor is to be installed into an apparatus such as a floppy disk drive, a high precision mounting jig is prepared, and the positioning of the linear pulse motor with respect to said apparatus is conducted with the aid of this jig prior to the actual mounting of the linear pulse motor. The use of such a jig means a requirement for extra time for the assembly of the device, and the need for a jig and the work required for preparing it inevitably raise the overall manufacturing cost.

Another problem that arises in connection with the manufacture of such a planar linear pulse motor relates to the detection of the position of the planar movable member thereof.

According to a conventional magnetic head drive device for a floppy disk drive such as the one shown in FIG. 17 of the accompanying drawings in perspective view, a feed screw thread 41 is formed on a rotary shaft of a rotary pulse motor 4 while a screw thread hole 52 is formed in a support plate 5 which supports a magnetic head 6 and is supported by a straight guide, and the feed screw thread 41 is engaged to the screw thread hole 52 so as to convert the rotary motion of the pulse motor 4 into the linear motion of the magnetic head assembly 6. However, according to this conventional device, the origin or the start of the travel of the pulse motor 4 is defined at the outer most track of the floppy disk 7 fitted in the device by attaching a light shielding plate 53 to a part of the magnetic head support plate 5 and by placing a photo sensor unit 8 on the traveling path of this light shielding plate 53 so as to permit the adjustment of the light shielding position for the purpose of defining the relative position of the magnetic head 6 and the floppy disk 7. However, according to this method of defining the origin or start of travel of the pulse motor 4, it is necessary to adjust the position of the photosensor unit 8 while looking at the signal output by the magnetic head assembly 6 from the floppy disk 7, after all the parts such as the pulse motor 4, the magnetic head support plate 5 and so on have been installed into the device, and this adjustment requires considerable effort. Furthermore, the photosensor unit 8 is typically one which is an off the shelf product which is large in external dimensions and is expensive, and this fact contributes to the large size and the high price of such a device. It has been proposed to apply a direct action type planar linear motor to such a magnetic head drive device, as for example in the previously discussed Japanese Patent Laying Open Publication No. 59-89565, but its travel origin detection mechanism is similar to the above described one, and the definition of the origin or start of travel thereof gives rise to similar problems.

SUMMARY OF THE INVENTION

Accordingly, it is the primary object of the present invention to provide a planar linear pulse motor, which avoids the problems detailed above.

It is a further object of the present invention to provide such a planar linear pulse motor, which is reduced in thickness as compared with prior art cylindrical type linear pulse motors.

It is a further object of the present invention to provide such a planar linear pulse motor, which is reduced in thickness even as compared with prior art planar type linear pulse motors.

It is a further object of the present invention to provide such a planar linear pulse motor, which is particularly suitable for application for driving the movement of the magnetic head or heads in a floppy disk drive of a word processor or a personal computer or the like.

It is a further object of the present invention to provide such a planar linear pulse motor, which, when thus applied for driving the movement of the magnetic head or heads in a floppy disk drive of a word processor or a personal computer or the like, can be reliably and easily aligned for ensuring that the head or heads of said floppy disk drive are accurately moved along a line which intersects the rotational axis of a floppy disk mounted in said floppy disk drive.

It is a further object of the present invention to provide such a planar linear pulse motor, which provides stabilized and smooth action.

It is a further object of the present invention to provide such a planar linear pulse motor, which is compact in overall construction and has reduced overall size.

It is a further object of the present invention to provide such a planar linear pulse motor, which is light in weight.

It is a yet further object of the present invention to provide such a planar linear pulse motor, which reduces the amount of relatively fine machining work which is required to be performed during the manufacture of its component parts.

It is a yet further object of the present invention to provide such a planar linear pulse motor, which does not require any very fine alignment or adjustment work to be performed during its assembly.

It is a yet further object of the present invention to provide such a planar linear pulse motor, which does not require any very fine positioning work for a permanent magnet and magnetic pole teeth incorporated in it to be performed during its assembly and manufacture.

It is a yet further object of the present invention to provide such a planar linear pulse motor, which does not require any particular high precision type of jig to be used, during the assembly of said planar linear pulse motor to a device in which it is to be incorporated.

It is a yet further object of the present invention to provide such a planar linear pulse motor, which permits easy adjustment and detection of the origin or start of the travel thereof by providing a position detecting mechanism between a movable member thereof and a stationary member thereof.

It is a yet further object of the present invention to provide such a planar linear pulse motor, which reduces the overall cost of a device in which it is to be incorporated.

It is a yet further object of the present invention to provide such a planar linear pulse motor, which reduces magnetic leakage and increases magnetic efficiency.

It is a yet further object of the present invention to provide such a planar linear pulse motor, which maximizes production efficiency and ease of assembly.

It is a yet further object of the present invention to provide such a planar linear pulse motor, which minimizes cost of assembly.

It is a yet further object of the present invention to provide such a planar linear pulse motor, which is low in overall cost.

According to the most general aspect of the present invention, these and other objects are attained by a planar linear pulse motor, comprising first and second assemblies which are mutually movable along an axial line; said first assembly comprising a group of magnetic pole teeth, said magnetic pole teeth being arranged at a determinate pitch in a row along a line substantially parallel to said axial line, and each said magnetic pole tooth being elongated in a direction substantially perpendicular to said axial line; and said second assembly comprising: four groups of magnetic pole teeth, each said group being arranged substantially at said determinate pitch in a row along a line substantially parallel to said axial line, with the phases of said four groups of magnetic pole teeth being substantially offset from one another, and each said magnetic pole tooth being elongated in a direction substantially perpendicular to said axial line; said four groups of magnetic pole teeth of this second assembly each substantially confronting said group of magnetic pole teeth of said first assembly in a substantially parallel relationship with a relatively small gap being present therebetween; a permanent magnet having opposite magnetic poles on its side surfaces on either side of a central longitudinal line thereof; a pair of magnetic core members, one of which is contiguous to one said magnetic pole side surface of said permanent magnet and the other of which is contiguous to the other said magnetic pole side surface of said permanent magnet, and each with two pole surfaces contiguous to two of said groups of magnetic pole teeth of this second assembly; and: for each of said magnetic core members, a means for inducing magnetic flux therein.

According to such a planar linear pulse motor as specified above, since the first assembly (which typically is the one of said first and second assemblies which is movable) and the second assembly (which typically is the one of said first and second assemblies which is fixed) are both planar in nature, as is a consequence of the second assembly being constituted by the pair of magnetic core members being fitted on opposite sides of the permanent magnet, thereby the thickness and the overall size of this planar linear pulse motor can be both reduced, and accordingly great advantages are obtained with regard to the fitting thereof to a device such as a floppy disk drive for a word processor or a personal computer or the like. Further, since the four groups of magnetic pole teeth of the second asembly can be formed by etching or by press forming or by some similar means, production precision can be kept high without any loss of production efficiency and without any unduly high cost being entailed.

According to a particular specialization of the present invention, the above and other objects may more particularly be accomplished by such a planar linear pulse motor as first specified above, wherein said four groups of magnetic pole teeth of said second assembly are formed as portions of one integral magnetic pole teeth member; and optionally said magnetic pole teeth member may comprise strip portions which integrally join together said four groups of magnetic pole teeth. Optionally, in more detail, said magnetic pole teeth member may be formed generally in a hollow rectangular shape, with said four groups of magnetic pole teeth being located at its four corners and said strip portions being integrally joined to said four groups of magnetic pole teeth and extending along its edges. In these cases, there will be further advantages with regard to ease of providing relative position of the pitch of the magnetic pole teeth of said four groups thereof. Further practical advantages accrue with regard to the stabilization of the operation of the planar linear pulse motor.

According to another particular specialization of the present invention, the above and other objects may more particularly be accomplished by such a planar linear pulse motor as first specified above, wherein said permanent magnet extends substantially parallel to said axial line. On the other hand, according to an alternative particular specialization of the present invention, the above and other objects may more particularly be accomplished by such a planar linear pulse motor as first specified above, wherein said permanent magnet extends substantially perpendicular to said axial line. Both of these possibilities have their own particular advantages, and which is more appropriate will depend upon the particular circumstances.

According to another particular specialization of the present invention, the above and other objects may more particularly be accomplished by such a planar linear pulse motor as first specified above, wherein said pair of magnetic core members and said four groups of magnetic pole teeth of said second assembly are all formed as portions of one unitary member. According to such a construction, manufacturing efficiency is improved and manufacturing cost is reduced through simplification and unification of component parts of the second assembly, and the leakage of magnetic flux is avoided and the magnetic efficiency is improved through elimination of the otherwise inevitable bonded interfaces. Furthermore, since the magnetic core members and the magnetic pole teeth portions of the second assembly are in this case made as one integral and unitary body, the size, in particular the thickness of the linear pulse motor can be reduced and various practical advantages can be obtained from this aspect of the construction, as well as from the aspect that the structure is simplified. Typically but not compulsorily, said permanent magnet of said second assembly may be tightly fitted into a slot formed in said unitary member. Alternatively, said permanent magnet of said second assembly may be molded into a slot formed in said unitary member.

According to another particular specialization of the present invention, the above and other objects may more particularly be accomplished by such a planar linear pulse motor as specified above, wherein said second assembly comprises a base member and a support wall rising up therefrom, said four groups of magnetic pole teeth being supported on either side of said permanent magnet on said base against said support wall. And, conveniently but not compulsorily, said support wall can be integrally formed with said base as a bent up tab portion thereof, and further can be formed with an extension adapted for mounting said planar linear pulse motor to another object. And a means, such as a spring optionally supported by a spring mounting portion formed on said base, can be provided for biasing said four groups of magnetic pole teeth and said permanent magnet against said support wall.

According to such a construction, the mutual positioning of the permanent magnet and the four groups of magnetic pole teeth can be conveniently and accurately performed, simply by mounting them with said four groups of magnetic pole teeth on either side of said permanent magnet resting on said base against said support wall, and by then either bonding these elements or biasing them by the aforementioned spring means (or both) against the support wall. Thereby, a substantial saving both in the number of parts and in the work required for assembly of the planar linear pulse motor can be obtained, thus naturally reducing overall manufacturing costs and increasing manufacturing efficiency.

According to another particular specialization of the present invention, the above and other objects may more particularly be accomplished by such a planar linear pulse motor as specified above, further comprising a means for mutually supporting said first and said second assembly with respect to one another so that they are mutually movable along said axial line, wherein said supporting means further comprises a means for positioning said planar linear pulse motor with respect to an element to which it is to be fitted; and, optionally but desirably, this supporting means may comprise a rail along which said first assembly slides, said positioning means comprising an extension of said rail at one or optionally at both of its ends. According to such a construction, the supporting means can fulfill, not only its primary function of providing sliding mounting of the first and second assembly with respect to one another, but also a function of thus aiding with the easy relative positioning of the planar linear pulse motor with respect to said element to which it is to be fitted. This economy of means is very convenient and economical of parts, and effectively eliminates the need for any special jig to be utilized during assembly of the planar linear pulse motor to said element to which it is to be fitted, which lowers overall manufacturing cost.

Or, according to an alternative more particular specialization of the present invention, the above and other objects may alternatively particularly be accomplished by such a planar linear pulse motor as first specified above, further comprising a means for detecting the position of said first assembly with respect to said second assembly. Optionally but desirably, said position detecting means may comprise: a electromagnetic radiation shielding element fitted to said first assembly; and a electromagnetic radiation emitting element and a electromagnetic radiation receiving element fitted to said second assembly; said electromagnetic radiation shielding element, when said first assembly is in a determinate position with respect to said second assembly, interrupting eletromagnetic radiation passing from said electromagnetic radiation emitting element to said electromagnetic radiation receiving element; but said electromagnetic radiation shielding element, when on the other hand said first assembly is not in said determinate position with respect to said second assembly, not thus interrupting electromagnetic radiation passing from said electromagnetic radiation emitting element to said electromagnetic radiation receiving element. According to such a construction, since the origin of the travel of the first assembly with respect to the second assembly is detected by the electromagnetic radiation emitting element and by the electromagnetic radiation receiving element provided to the second assembly in cooperation with the electromagnetic radiation shielding plate provided to the first assembly, and all these elements are incorporated into the planar linear pulse motor rather than being provided as a separate off the shelf position detecting assembly as was the case in the prior art shown in FIG. 17, practical advantages such as compact design and cost reduction of a magnetic head drive device incorporating this planar linear pulse motor can be accomplished.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and.

Figure 3A:
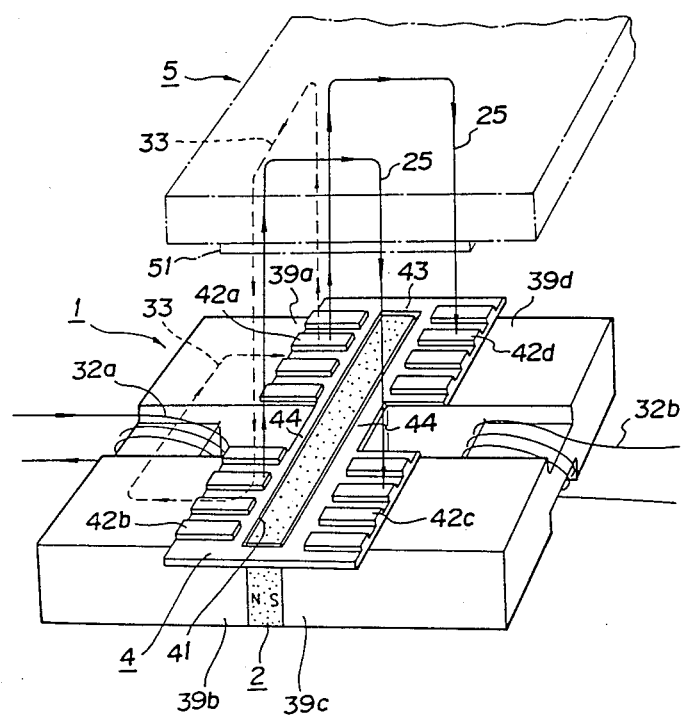
FIG. 3a is a partial perspective view showing a first operational phase of said first preferred embodiment of the planar linear pulse motor of the present invention, with a gap between a slidably mounted movable member thereof and said stationary assembly thereof being grossly exaggerated for the purposes of explanation.
Figure 3B:
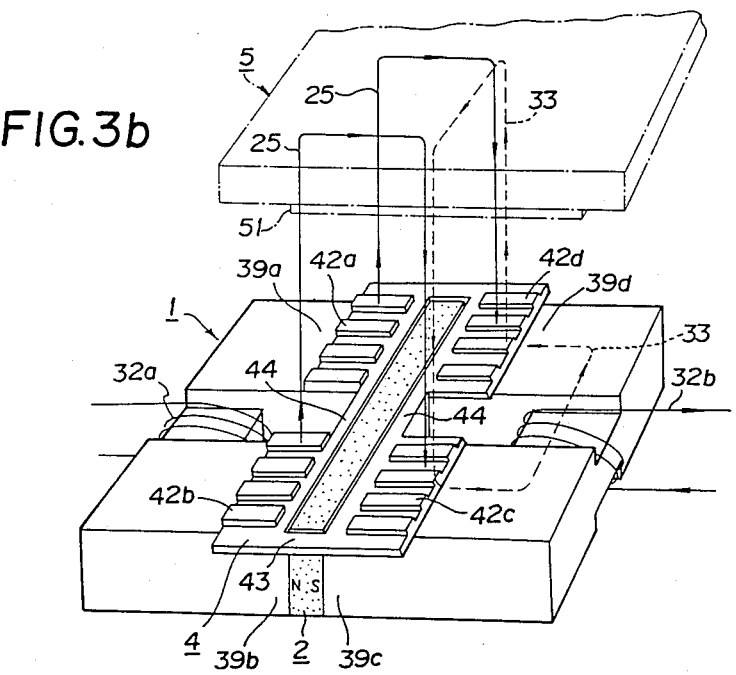
FIG. 3b is a partial perspective view, similar to FIG. 3a and similarly grossly exaggerated, showing a second operational phase of said first preferred embodiment of the planar linear pulse motor of the present invention.
Figure 3C:
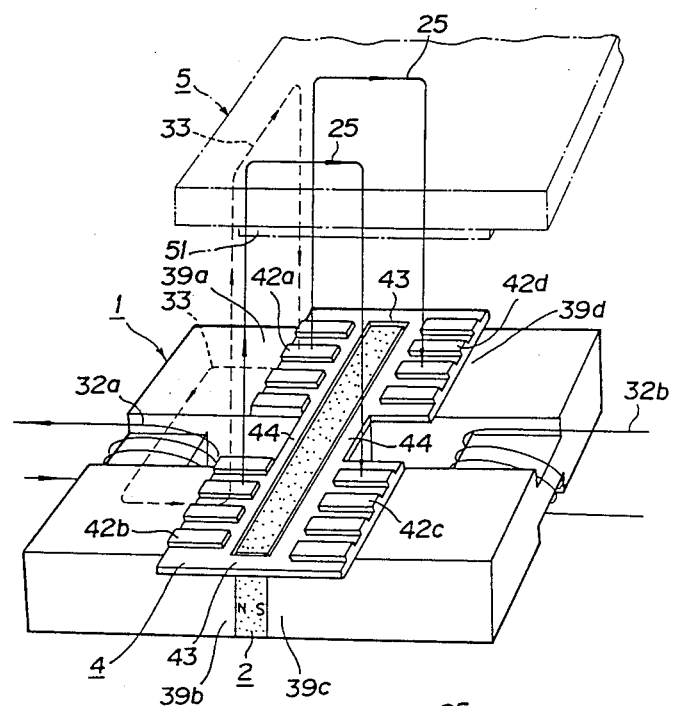
FIG. 3c is a partial perspective view, similar to FIGS. 3a and 3b and similarly grossly exaggerated, showing a third operational phase of said first preferred embodiment of the planar linear pulse motor of the present invention.
Figure 3D:
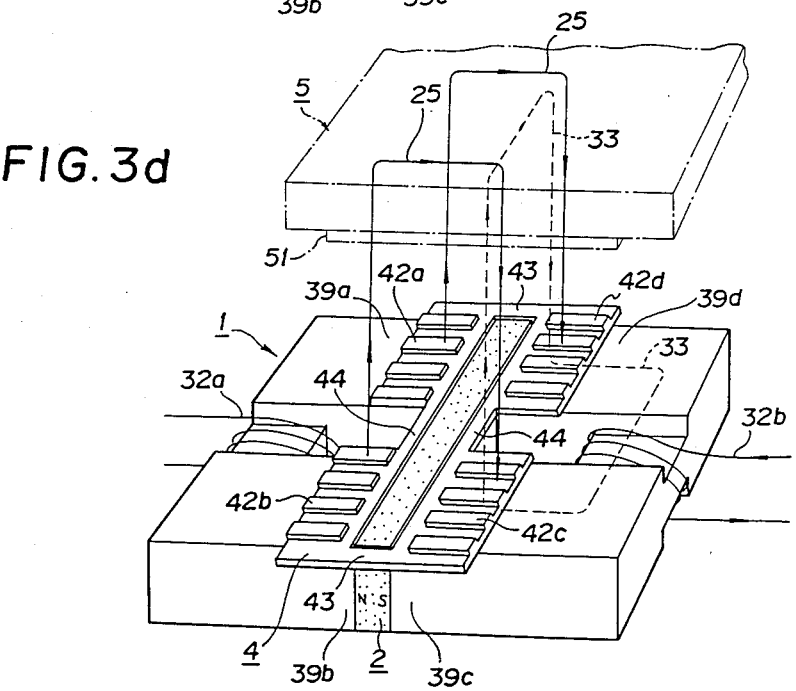
FIG. 3d is a partial perspective view, similar to FIGS. 3a through 3c and similarly grossly exaggerated, showing a fourth operational phase of said first preferred embodiment of the planar linear pulse motor of the present invention.
Figure 4:
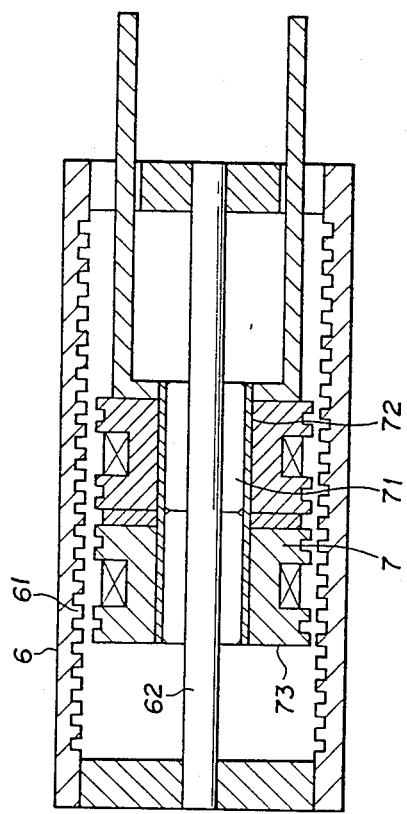
FIG. 4, which relates to the prior art, is an axial longitudinal sectional view showing a prior art cylindrical type linear pulse motor.
Figure 5A:
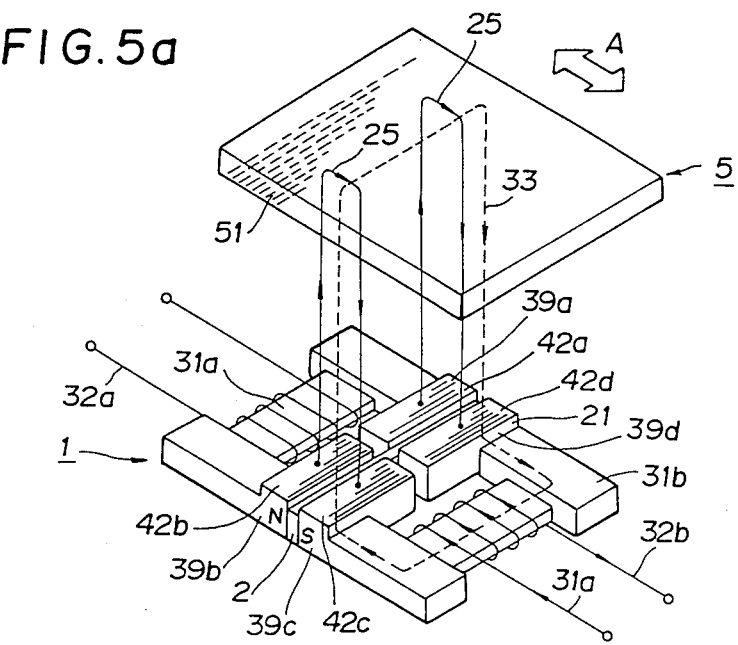
Figure 5B:
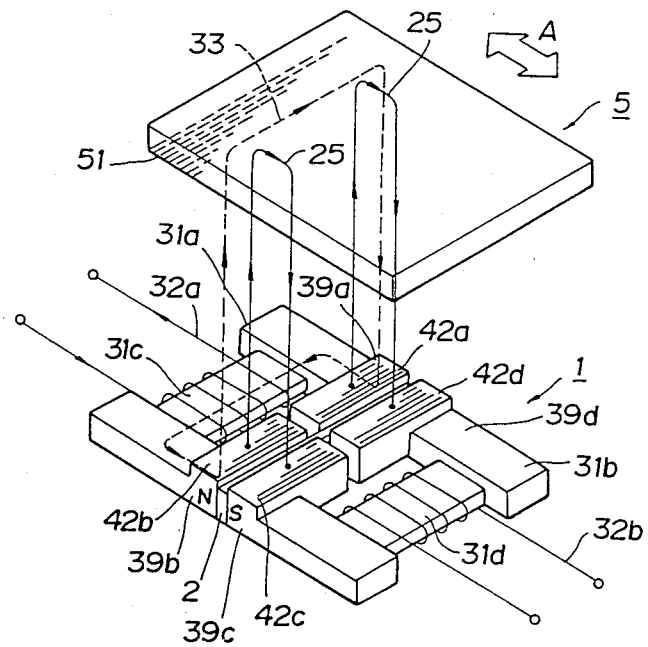
Figure 5C:
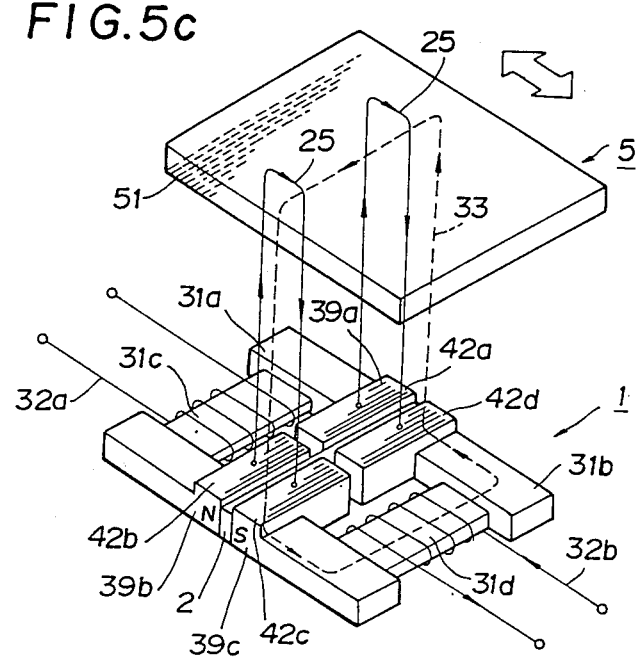
Figure 5D:
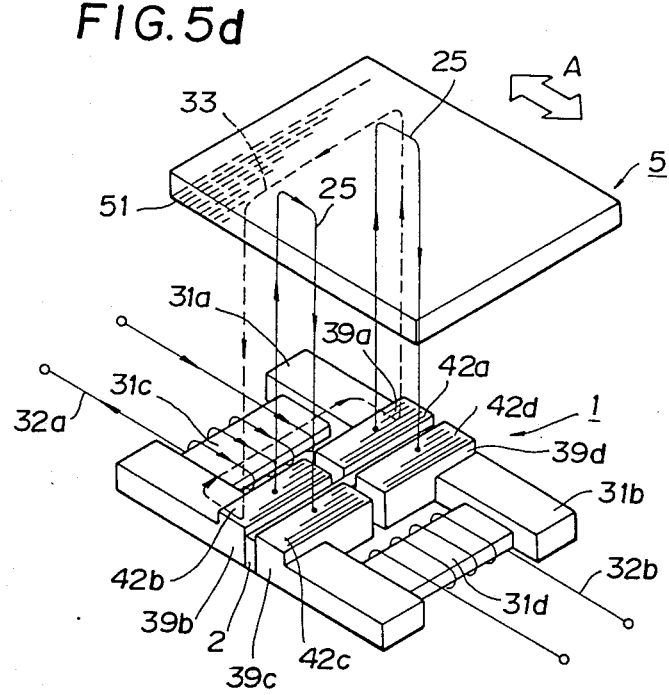
Figure 6:
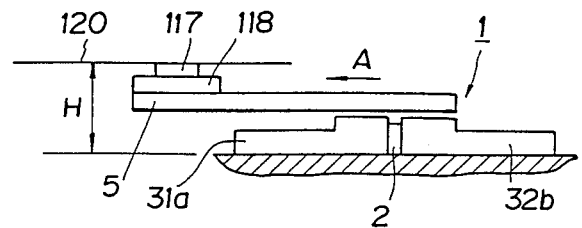
Figure 7:
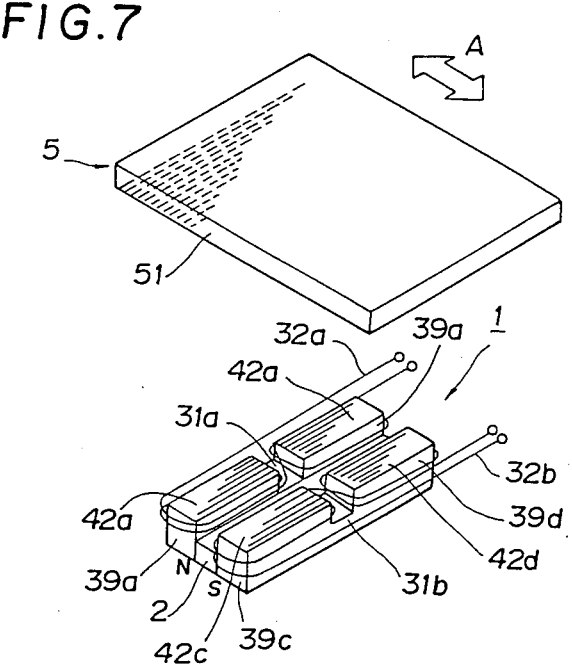
Figure 8:
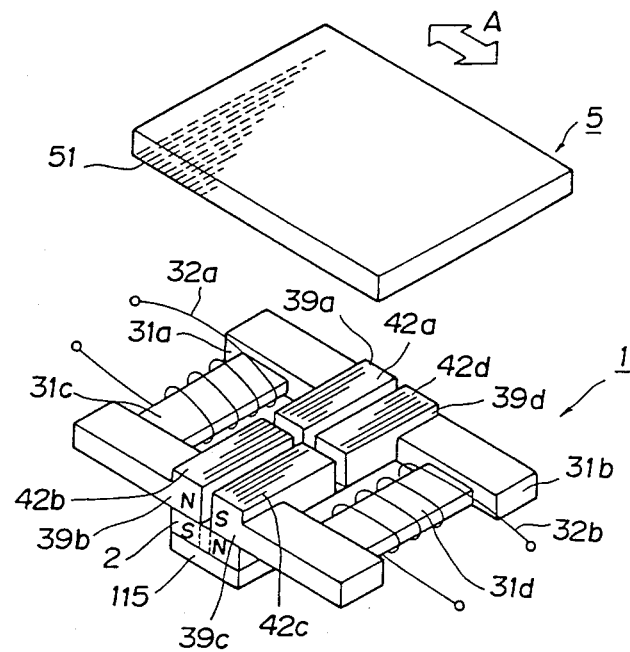
Figure 9:
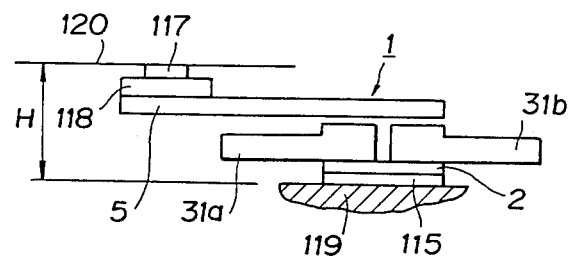
Figure 10:
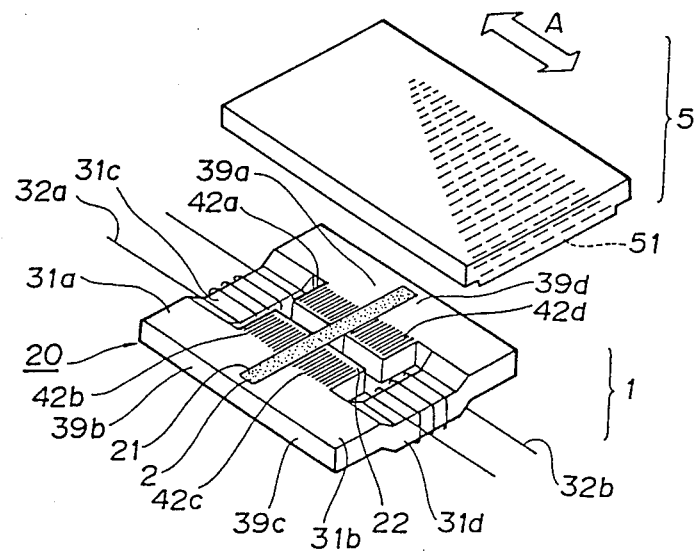
Figure 11:
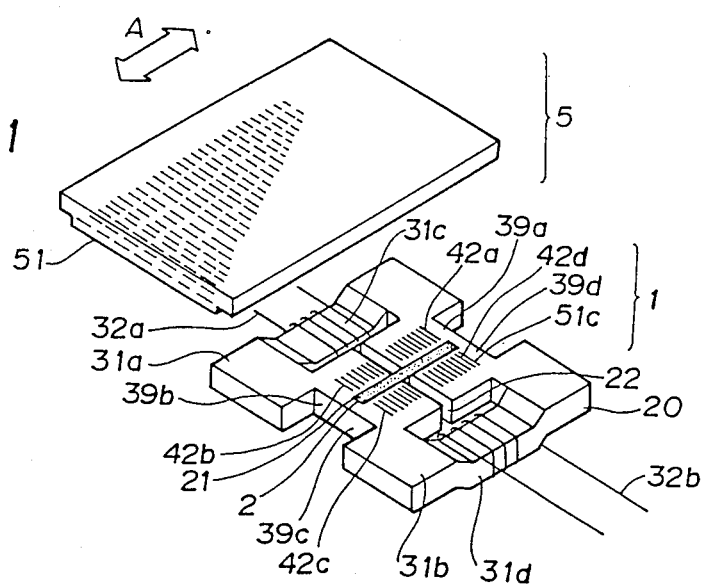
Figure 12:
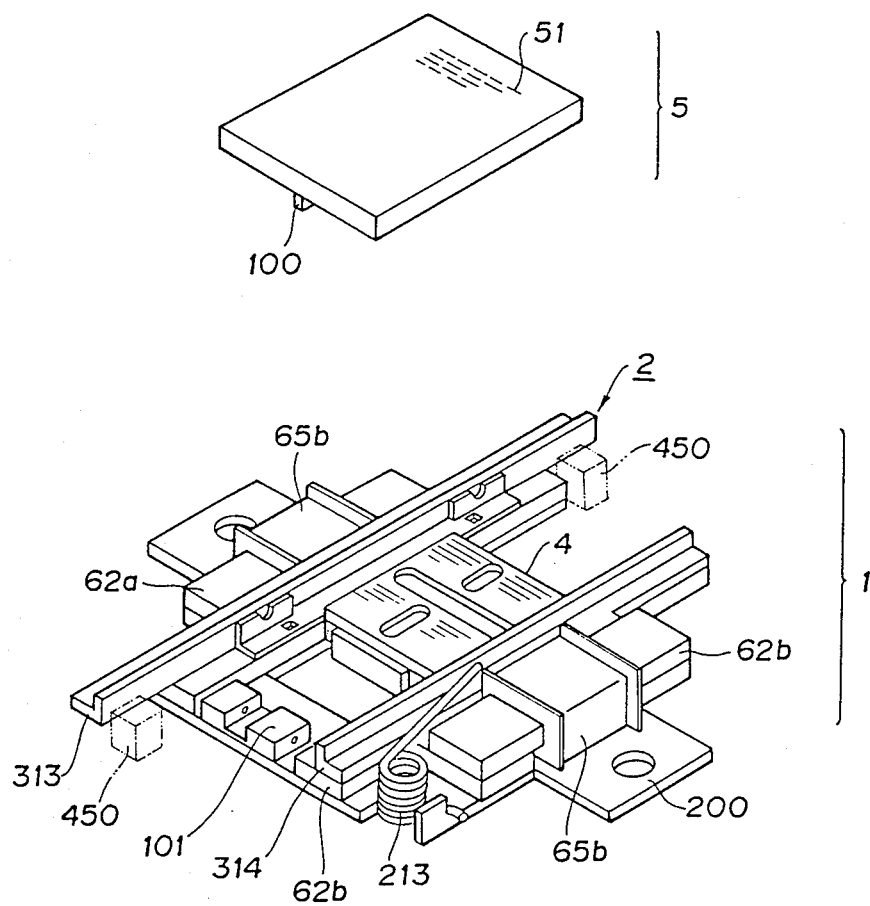
Figure 13:
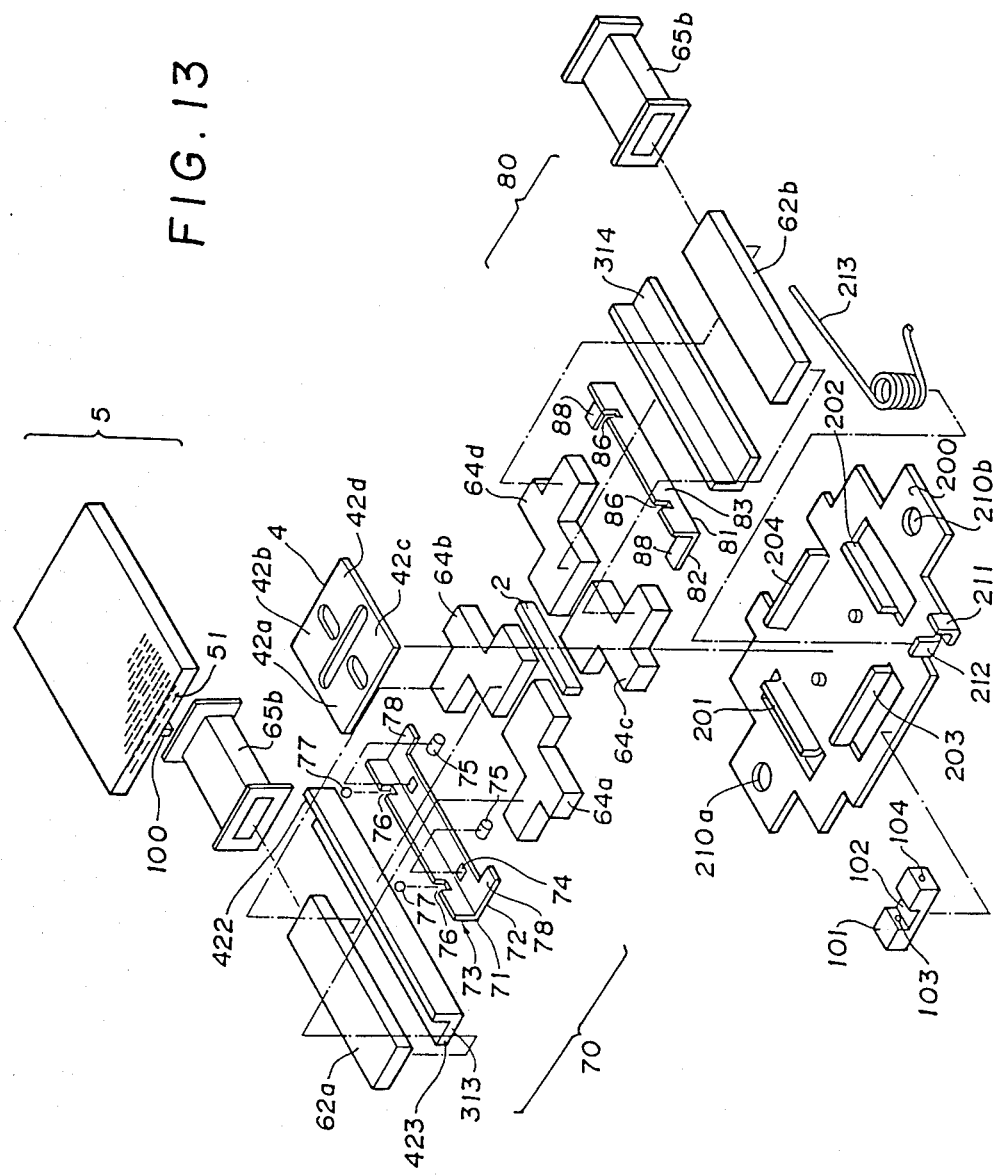
Figure 14:
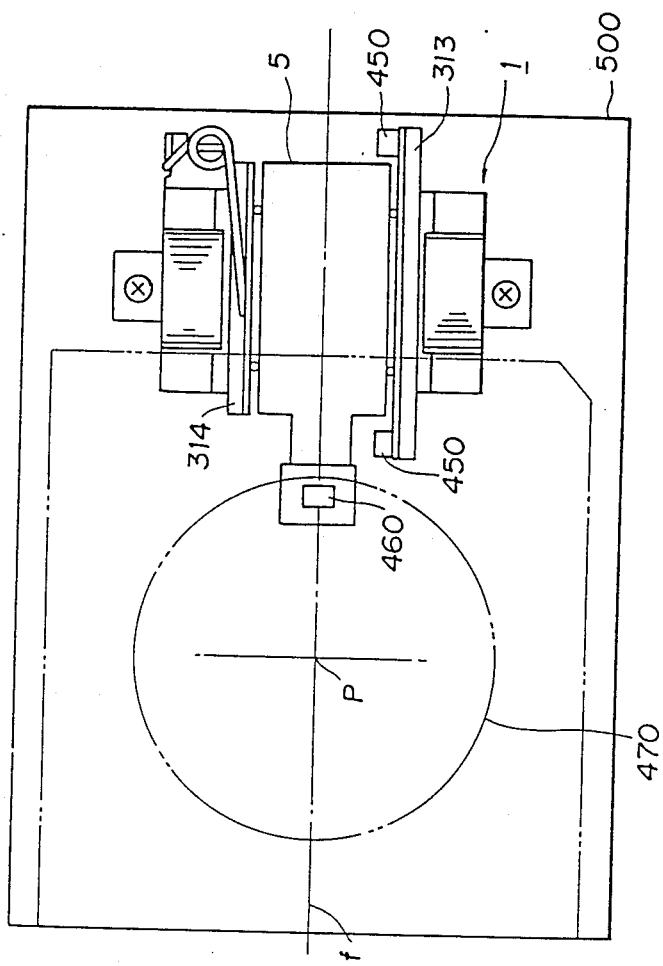
Figure 15:
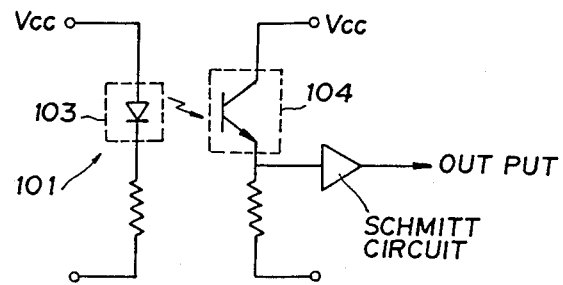
Figure 16:
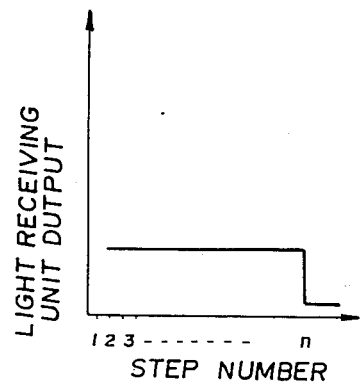
Figure 17:
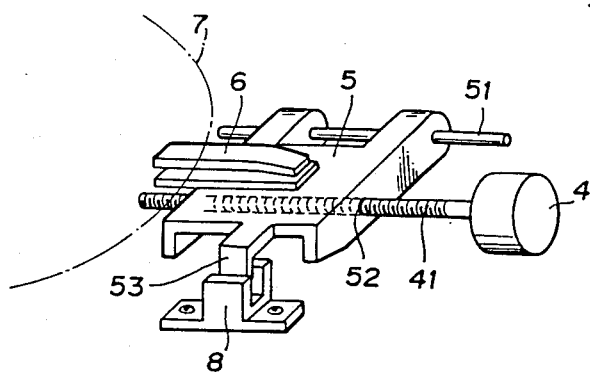

5a is a partial perspective view, similar to FIG. 3a for the first preferred embodiment, showing a first operational phase of a second preferred embodiment of the planar linear pulse motor of the present invention, again with a gap between a slidably mounted movable member thereof and a stationary assembly thereof being grossly exaggerated for the purposes of explanation;

FIG. 5b is a partial perspective view, similar to FIG. 3b for the first preferred embodiment and similarly grossly exaggerated, showing a second operational phase of said second preferred embodiment of the planar linear pulse motor of the present invention;

FIG. 5c is a partial perspective view, similar to FIG. 3c for the first preferred embodiment and similarly grossly exaggerated, showing a third operational phase of said second preferred embodiment of the planar linear pulse motor of the present invention;

FIG. 5d is a partial perspective view, similar to FIG. 3d for the first preferred embodiment and similarly grossly exaggerated, showing a fourth operational phase of said second preferred embodiment of the planar linear pulse motor of the present invention;

FIG. 6, similarly to FIG. 4 for the prior art, is an axial longitudinal sectional view showing an exemplary application of this planar type linear pulse motor to a floppy disk drive of a word processor or a personal computer or the like;

FIG. 7, similarly to FIG. 5a for the second preferred embodiment, is a partial perspective view showing a third preferred embodiment of the planar linear pulse motor of the present invention, again with a gap between a slidably mounted movable member thereof and a stationary assembly thereof being grossly exaggerated for the purposes of explanation;

FIG. 8, similarly to FIG. 5a for the second preferred embodiment and FIG. 6 for the third preferred embodiment, is a partial perspective view showing a prior art type planar linear pulse motor, again with a gap between a slidably mounted movable member thereof and a stationary assembly thereof being grossly exaggerated for the purposes of explanation;

FIG. 9, similarly to FIG. 6 for the second preferred embodiment of the planar linear pulse motor of the present invention, is an axial longitudinal sectional view showing an exemplary application of the prior art planar type linear pulse motor of FIG. 8 to a floppy disk drive of a word processor or a personal computer or the like;

FIG. 10, similarly to FIG. 7 for the third preferred embodiment, is a partial perspective view showing a fourth preferred embodiment of the planar linear pulse motor of the present invention, again with a gap between a slidably mounted movable member thereof and a stationary assembly thereof being grossly exaggerated for the purposes of explanation;

FIG. 11, similarly to FIG. 3a for the first preferred embodiment, is a partial perspective view showing a fifth preferred embodiment of the planar linear pulse motor of the present invention, again with a gap between a slidably mounted movable member thereof and a stationary assembly thereof being grossly exaggerated for the purposes of explanation;

FIG. 12, similarly to FIG. 11 for the fifth preferred embodiment, is a partial perspective view showing a sixth preferred embodiment of the planar linear pulse motor of the present invention, said sixth preferred embodiment including a sliding mounting construction for the slidably mounted movable member, which is shown as lifted away from said sliding mounting construction and from the stationary assembly for the convenience of illustration;

FIG. 13 is an exploded view of said sixth preferred embodiment for the purposes of explaining the construction and the assembly thereof;

FIG. 14 is a schematic plan view showing an exemplary application of the sixth preferred embodiment planar type linear pulse motor of FIGS. 12 and 13 to a floppy disk drive of a word processor or a personal computer or the like;

FIG. 15 is a circuit diagram schematically illustrating a Schmitt circuit which is used for detecting the position of the planar movable member of the sixth preferred embodiment;

FIG. 16 is a graph, in which the number of steps executed by this sixth preferred embodiment planar linear motor of FIGS. 12 through 14 is shown along the horizontal axis and the output of a light receiving unit incorporated therein is shown along the vertical axis, for illustrating how the axial position of said planar movable member thereof may be detected; and:

FIG. 17 is a perspective view of a prior art type of means for detecting the axial position of a movable member of a linear motor.

DESCRIPTION OF THE PREFERRED EMBODIMENTS

The present invention will now be described with reference to the preferred embodiments thereof, and with reference to the figures.

THE FIRST PREFERRED EMBODIMENT

FIGS. 1, 2, and 3a through 3d relate to the first preferred embodiment of the planar linear pulse motor of the present invention.

Construction

Figure 1:
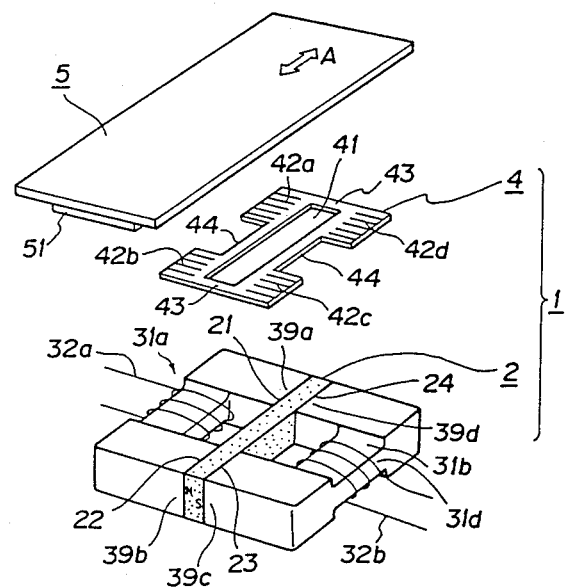
FIG. 1 is an exploded perspective view showing important parts of the first preferred embodiment of the planar linear pulse motor of the present invention.

In said first preferred embodiment of the planar linear pulse motor of the present invention, as shown in partial exploded perspective view in FIG. 1, the reference numeral 1 denotes a stationary assembly thereof, while the reference numeral 5 refers to a movable member thereof, slidably mounted with respect to the stationary assembly 1 as shown by the arrow "A" in the figures. It should be understood that, although the assembly 1 will hereinafter be referred to as "stationary" and the member 5 will hereinafter be referred to as "movable", these terms are only used as reference to the intended application of this planar linear pulse motor, and are not to be considered as limitative of the present invention, since all that is required is that the assembly 1 and the member 5 should be mutually slidably movable; neither of them is actually required to be stationary in the absolute sense.

Figure 2:
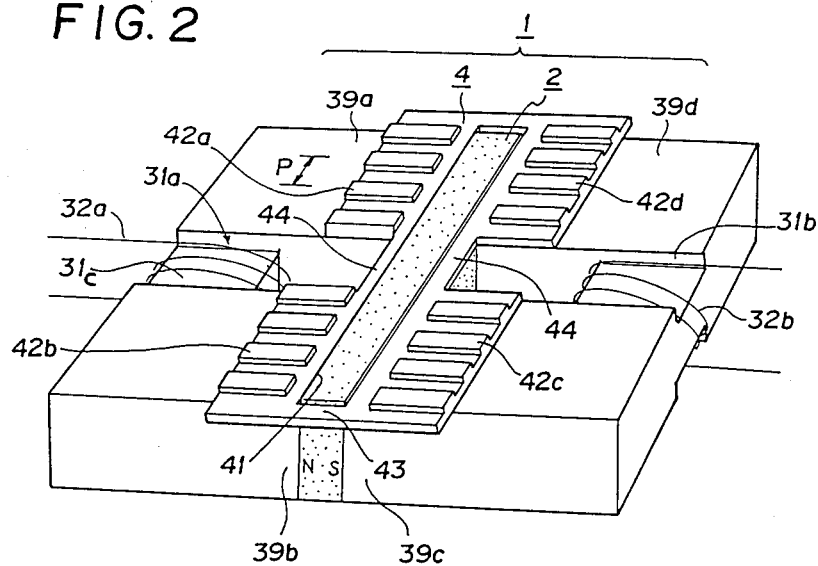
FIG. 2 is a perspective view showing in isolation a stationary assembly included in said first preferred embodiment of the planar linear pulse motor of the present invention.

The stationary assembly 1, which is shown by itself in FIG. 2, comprises a permanent magnet 2 which is shaped as a prism (a rectangular prism in this preferred embodiment), and at each of its ends, only one of which is shown in the figures, this permanent magnet 2 has magnetic poles on its opposite side surfaces which are different in polarity but are the same along each said side surface: in the exemplary configuration of FIG. 1, the left side surface of the permanent magnet 2 at its end nearest to the viewer is a north or N pole, while the right side surface of said permanent magnet 2 at its end nearest to the viewer is a south or S pole. And, particularly in this first preferred embodiment of the planar linear pulse motor of the present invention, the permanent magnet 2 extends in the direction of sliding motion of the planar movable member 5, as will be explained later. A pair of magnetic core members 31a and 31b are provided, each being generally shaped like a letter "C", with central portions thereof denoted respectively as 31c and 31d being narrowed down somewhat. The one end portion designated as 39a in the figures of the one 31a of these magnetic core members is applied against, i.e. is fixed in direct contact with, the left side surface in the figures of the permanent magnet 2 at its end farthest from the viewer which is exemplarily shown as being a north or N pole—for example by being bonded thereto; the other end portion designated as 39b in the figures of said one magnetic core member 31a is applied against, i.e. is likewise fixed in direct contact with, the left side surface in the figures of said permanent magnet 2 at its end closest to the viewer which is also exemplarily shown as being a north or N pole—again, for example by being bonded thereto; the one end portion designated as 39c in the figures of the other one 31b of said magnetic core members is applied against, i.e. is likewise fixed in direct contact with, the right side surface in the figures of said permanent magnet 2 at its end closest to the viewer which is exemplarily shown as being a south or S pole—again, for example by being bonded thereto; and the other end portion designated as 39d in the figures of said other magnetic core member 31b is applied against, i.e. is likewise fixed in direct contact with, the right side surface in the figures of said permanent magnet 2 at its end farthest from the viewer which is also exemplarily shown as being a south or S pole—again, for example by being bonded thereto. And a coil 32a is wound around the narrowed down portion 31c of the magnetic core member 31a, while similarly a coil 32b is wound around the narrowed down portion 31d of the magnetic core member 31b.

A magnetic pole plate member 4 is fixed, as for example by being bonded, across the upper surfaces in the figure of the end portions 39a through 39d of the magnetic core members 31a and 31b, around the two ends of the upper surface in the figure of the permanent magnet 2, so as to be securely held relatively closely to said upper surfaces of said end portions 39a through 39d, so as to allow relatively easy passage of magnetic flux between itself and them. In detail, the magnetic pole plate member 4 is formed as a hollow rectangular member, with a rectangular cut out hole 41 in its central portion which corresponds to the upper surface of the permanent magnet 2, with relatively wide magnetic pole teeth portions 42a, 42b, 42c, and 42d at the corner end portions of the long sides of said rectangular cut out hole 41 in positions which correspond respectively to the upper surfaces of the end portions 39a, 39b, 39c and 39d of the magnetic core members 31a and 31b, with relatively thin connecting portions 43 extending along the short sides of said rectangular cut out hole 41 which thus join together the magnetic pole teeth portions 42a and 42d and join together the magnetic pole teeth portions 42b and 42c, and with relatively thin connecting portions 44 extending along said long sides of said rectangular cut out hole 41 which thus join together the magnetic pole teeth portions 42a and 42b and join together the magnetic pole teeth portions 42c and 42d. Each of the upper surfaces of each of these magnetic pole teeth portions 42a through 42d is formed with a series of magnetic pole teeth 42, the ones of these magnetic pole teeth 42 arranged along each particular one of said magnetic pole teeth portions 42a through 42d being set in series at the same pitch, designated in FIG. 2 as P, with the phase of the series of these magnetic pole teeth 42 arranged along the magnetic pole teeth portion 42a being set at a phase difference of P/2 from the phase of the series of the magnetic pole teeth 42 arranged along the magnetic pole teeth portion 42b, with the phase of the series of the magnetic pole teeth 42 arranged along the magnetic pole teeth portion 42c being likewise set at a phase difference of P/2 from the phase of the series of the magnetic pole teeth 42 arranged along the magnetic pole teeth portion 42d, with the phase of the series of the magnetic pole teeth 42 arranged along the magnetic pole teeth portion 42a being set at a phase difference of P/4 from the phase of the series of the magnetic pole teeth 42 arranged along the magnetic pole teeth portion 42d, and with therefore the phase of the series of the magnetic pole teeth 42 arranged along the magnetic pole teeth portion 42b being consequently and likewise set at a like phase difference of P/4 from the phase of the series of the magnetic pole teeth 42 arranged along the magnetic pole teeth portion 42c. In more detail, to consider the phases of the four series of magnetic pole teeth 42 arranged along the four magnetic pole teeth portions 42a, 42c, 42b, and 42d in this specified order, each differs from the previous one by a phase difference of P/4, in the same advancing sense.

The lower surface (not visible in the figures) of the slidably mounted planar movable member 5 is formed with a series 51 of magnetic pole teeth which are set in series at the same pitch P as the magnetic pole teeth on each of the magnetic pole teeth portions 42a through 42d. And this planar movable member 5 is slidably mounted, by a linear bearing type construction not shown in figures, so as to be movable with respect to the stationary assembly 1 to and fro in the direction shown by an arrow "A" in the figures, and so that the teeth series 51 on its lower surface opposes the magnetic pole teeth on the magnetic pole teeth portions 42a through 42d with a relatively small gap, typically about 50 microns, being left therebetween. Each of the magnetic pole teeth of the series 51 thereof on the planar movable member 5 is continuous from the left side thereof which can correspond to one of the teeth of the magnetic pole teeth portion 42a or 42d to the right side thereof which can correspond to one of the teeth of the magnetic pole teeth portion 42b or 42c.

Operation

This first preferred embodiment of the planar linear pulse motor of the present invention operates as will now be described with reference to FIGS. 3a through 3d. In these figures, the reference numeral 25 denotes the magnetic flux generated by the permanent magnet 2, while the reference numeral 33 denotes magnetic flux generated by one or the other of the magnetic coils 32a or 32b.

First, as shown in all the figures 3a through 3d and by the solid lines shown as 25 which represent the magnetic flux generated by the permanent magnet 2 (flux lines are herein shown as proceeding from north or N poles to south or S poles), generally the lines of this permanent magnetic flux 25 proceed from the left side in the figures of the permanent magnet 2 which is a north or N pole, into one or the other of the end portions 39a or 39b of the magnetic core member 31a, thence through one or another of the magnetic pole teeth on the magnetic pole teeth portions 42a or 42b respectively affixed to said magnetic core member end portion, across the relatively narrow gap between said magnetic pole tooth on said magnetic pole teeth portion 42a or 42b to an opposing or nearly opposing one of the magnetic pole teeth of the series 51 thereof on the planar movable member 5, along through said magnetic pole tooth of said series 51, again across the relatively narrow gap between said magnetic pole tooth of said series 51 to an opposing or nearly opposing one of the magnetic pole teeth on the magnetic pole teeth portion 42d or 42c respectively, finally to return to the right side in the figures of the permanent magnet 2, which is a south or S pole, via the end portion 39d or 39c of the magnetic core member 31b respectively affixed to said magnetic pole teeth portion. And this general pattern is effective, whatever be the position of the planar movable member 5 relative to the stationary assembly 1.

Referring to the state of the apparatus shown in FIG. 3a, from this state first an electric current is passed through the coil 32a mounted on the magnetic core member 31a in the exemplary direction shown in the figure, and then exemplarily the end of said magnetic core member 31a towards the viewer in the figures is now caused to become a south or S pole while the end of said magnetic core member 31a away from the viewer in the figures is now caused to become a north or N pole, and thus a magnetic flux is induced each exemplary one 33 of the lines of which proceeds out from the upper side surface of said end away from the viewer in the figures of the magnetic core member 31a which is now said north or N pole thereof, through an exemplary one of the magnetic pole teeth on the magnetic pole teeth portion 42a which is closely affixed to said upper side surface, across the relatively narrow gap between said magnetic pole tooth on said magnetic pole teeth portion 42a to an opposing or nearly opposing one of the magnetic pole teeth of the series 51 thereof on the planar movable member 5—thus reinforcing the one of the permanent magnetic flux lines 25 which is passing across said relatively narrow gap in the same direction as explained above—along through the planar movable member 5 to another exemplary magnetic pole tooth of said series 51 thereon which opposes or nearly opposes an exemplary one of the magnetic pole teeth on the magnetic pole teeth portion 42b which is closely affixed to the upper side surface of the end towards the viewer in the figures of the magnetic core member 31a which is now the south or S pole thereof, again across the relatively narrow gap between said magnetic pole tooth of said series 51 to said opposing or nearly opposing one of said magnetic pole teeth on said magnetic pole teeth portion 42b—thus opposing and at least partially canceling the one of the permanent magnetic flux lines 25 which is passing across said relatively narrow gap in the opposite direction as explained above—finally to return to said upper side surface of the end towards the viewer in the figures of the magnetic core member 31a which is now the south or S pole thereof.

Thereby, as a whole, the magnetic flux between the magnetic pole teeth on the magnetic pole teeth portion 42a of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42b of said magnetic pole plate member 4 and the opposing ones of the magnetic pole teeth of the series 51 thereof on the planar movable member 5 is weakened; and, because the connecting portions 44 of the magnetic pole plate member 4 are relatively thin and accordingly have relatively high magnetic resistance and are also easily subject to magnetic saturation, the magnetic fluxes between the magnetic pole teeth on the magnetic pole teeth portions 42c and 42d of said magnetic pole plate member 4 and the opposing ones of the magnetic pole teeth of the series 51 thereof on the planar movable member 5 are substantially unaffected. Further, because the connecting portions 43 of the magnetic pole plate member 4 are also relatively thin and accordingly have relatively high magnetic resistance and are also easily subject to magnetic saturation, little leakage of the above described magnetic flux lines 33 directly between the two ends of the magnetic core member 31a can occur through them. And, as a result of the above described mutual reinforcement and cancellation of the permanent magnetic flux lines 25 and induced magnetic flux lines 33, a linear force is induced in the direction shown by the arrow "A" in the figure which tends to bring the magnetic pole teeth on said magnetic pole teeth portion 42a of said magnetic pole plate member 4 and the opposing ones of the magnetic pole teeth of the series 51 thereof on the planar movable member 5 together, while on the other hand separating the magnetic pole teeth on said magnetic pole teeth portion 42b of said magnetic pole plate member 4 and the opposing ones of the magnetic pole teeth of the series 51 thereof on the planar movable member 5.

Next, referring to the state of the apparatus shown in FIG. 3b, the supply of electric current through the coil 32a mounted on the magnetic core member 31a is stopped, and an electric current is passed through the other coil 32b mounted on the other magnetic core member 31b in the exemplary direction shown in the figure, and then exemplarily the end of said magnetic core member 31b towards the viewer in the figures is now caused to become a south or S pole while the end of said magnetic core member 31b away from the viewer in the figures is now caused to become a north or N pole, and thus a magnetic flux is induced each exemplary one 33 of the lines of which proceeds out from the upper side surface of said end away from the viewer in the figures of the magnetic core member 31b which is now said north or N pole thereof, through an exemplary one of the magnetic pole teeth on the magnetic pole teeth portion 42d which is closely affixed to said upper side surface, across the relatively narrow gap between said magnetic pole tooth on said magnetic pole teeth portion 42d to an opposing or nearly opposing one of the magnetic pole teeth of the series 51 thereof on the planar movable member 5—thus opposing and at least partially canceling the one of the permanent magnetic flux lines 25 which is passing across said relatively narrow gap in the opposite direction as explained above—along through the planar movable member 5 to another exemplary magnetic pole tooth of said series 51 thereon which opposes or nearly opposes an exemplary one of the magnetic pole teeth on the magnetic pole teeth portion 42c which is closely affixed to the upper side surface of the end towards the viewer in the figures of the magnetic core member 31b which is now the south or S pole thereof, again across the relatively narrow gap between said magnetic pole tooth of said series 51 to said opposing or nearly opposing one of said magnetic pole teeth on said magnetic pole teeth portion 42c—thus reinforcing the one of the permanent magnetic flux lines 25 which is passing across said relatively narrow gap in the same direction as explained above—finally to return to said upper side surface of the end towards the viewer in the figures of the magnetic core member 31b which is now the south or S pole thereof.

Thereby, as a whole, the magnetic flux between the magnetic pole teeth on the magnetic pole teeth portion 42c of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42d of said magnetic pole plate member 4 and the opposing ones of the magnetic pole teeth of the series 51 thereof on the planar movable member 5 is weakened; and, again, because the connecting portions 44 of the magnetic pole plate member 4 are relatively thin, the magnetic fluxes between the magnetic pole teeth on the magnetic pole teeth portions 42a and 42b of said magnetic pole plate member 4 and the opposing ones of the magnetic pole teeth of the series 51 thereof on the planar movable member 5 are substantially unaffected. Further, again, because the connecting portions 43 of the magnetic pole plate member 4 are also relatively thin, little leakage of the above described magnetic flux line 33 directly between the two ends of the magnetic core member 31b can occur through them. And, as a result of the above described mutual reinforcement and cancellation of the permanent magnetic flux lines 25 and induced magnetic flux lines 33, a linear force is induced in the direction shown in the arrow "A" in the figure which tends to bring the magnetic pole teeth on said magnetic pole teeth portion 42d of said magnetic pole plate member 4 and the opposing ones of the magnetic pole teeth of the series 51 thereof on the planar movable member 5 together, while on the other hand separating the magnetic pole teeth on said magnetic pole teeth portion 42d of said magnetic pole plate member 4 and the opposing ones of the magnetic pole teeth of the series 51 thereof on the planar movable member 5.

Since the phase difference between the magnetic pole teeth on the magnetic pole teeth portion 42a of the magnetic pole plate member 4 and the magnetic pole teeth on the magnetic pole teeth portion 42c thereof is set, as explained above, to be P/4, the transition from the state of the apparatus shown by FIG. 3a to the state of the apparatus shown by FIG. 3b proceeds relatively smoothly, and the planar movable member 5 is smoothly propelled along.

Next, referring to the state of the apparatus shown in FIG. 3c, the supply of electric current through the coil 32b mounted on the magnetic core member 31b is stopped, and now an electric current is passed through the other coil 32a mounted on the other magnetic core member 31a in the reverse direction to that utilized in the state of the apparatus shown in FIG. 3a, i.e. in the exemplary direction shown in the present FIG. 3c, and thus the end of said magnetic core member 31a towards the viewer in the figures is now caused to become a north or N pole while the end of said magnetic core member 31a away from the viewer in the figures is now caused to become a south or S pole, and thus a magnetic flux is induced each exemplary one 33 of the lines of which proceeds out from the upper side surface of said end towards the viewer in the figures of the magnetic core member 31a which is now said north or N pole thereof, through an exemplary one of the magnetic pole teeth on the magnetic pole teeth portion 42b which is closely affixed to said upper side surface, across the relatively narrow gap between said magnetic pole tooth on said magnetic pole teeth portion 42b to an opposing or nearly opposing one of the magnetic pole teeth of the series 51 thereof on the planar movable member 5—thus reinforcing the one of the permanent magnetic flux lines 25 which is passing across said relatively narrow gap in the opposite direction as explained above—along through the planar movable member 5 to another exemplary magnetic pole tooth of said series 51 thereon which opposes or nearly opposes an exemplary one of the magnetic pole teeth on the magnetic pole teeth portion 42a which is closely affixed to the upper side surface of the end away from the viewer in the figures of the magnetic core member 31a which is now the south or S pole thereof, again across the relatively narrow gap between said magnetic pole tooth of said series 51 to said opposing or nearly opposing one of said magnetic pole teeth on said magnetic pole teeth portion 42a—thus opposing and at least partially canceling the one of the permanent magnetic flux lines 25 which is passing across said relatively narrow gap in the same direction as explained above—finally to return to said upper side surface of said end away from the viewer in the figures of said magnetic core member 31a which is now the south or S pole thereof.

Thereby, as a whole, the magnetic flux between the magnetic pole teeth on the magnetic pole teeth portion 42b of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42a of said magnetic pole plate member 4 and the opposing ones of the magnetic pole teeth of the series 51 thereof on the planar movable member 5 is weakened; and, again, because the connecting portions 44 of the magnetic pole plate member 4 are relatively thin, the magnetic fluxes between the magnetic pole teeth on the magnetic pole teeth portions 42c and 42d of said magnetic pole plate member 4 and the opposing ones of the magnetic pole teeth of the series 51 thereof on the planar movable member 5 are substantially unaffected. Further, again, because the connecting portions 43 of the magnetic pole plate member 4 are also relatively thin, little leakage of the above described magnetic flux lines 33 directly between the two ends of the magnetic core member 31a can occur through them. And, as a result of the above described reinforcement and cancellation of the permanent magnetic flux lines 25 and induced magnetic flux lines 33, a linear force is induced in the direction shown by the arrow "A" in the figure which tends to bring the magnetic pole teeth on said magnetic pole teeth portion 42b of said magnetic pole plate member 4 and the opposing ones of the magnetic pole teeth of the series 51 thereof on the planar movable member 5 together, while on the other hand separating the magnetic pole teeth on said magnetic pole teeth portion 42a of said magnetic pole plate member 4 and the opposing ones of the magnetic pole teeth of the series 51 thereof on the planar movable member 5.

Since the phase difference between the magnetic pole teeth on the magnetic pole teeth portion 42c of the magnetic pole plate member 4 and the magnetic pole teeth on the magnetic pole teeth portion 42b thereof is set, as also explaoned above, to be P/4, the transition from the state of the apparatus shown in FIG. 3b to the state of the apparatus shown by FIG. 3c proceeds relatively smoothly, and the planar movable member 5 is further smoothly propelled along.

Finally, referring to the state of the apparatus shown in FIG. 3d, next the supply of electric current through the coil 32a mounted on the magnetic core member 31a is stopped, and now an electric current is passed through the other coil 32b mounted on the other magnetic core member 31b in the reverse direction to that utilized in the state of the apparatus shown in FIG. 3b, i.e. in the exemplary direction shown in the present FIG. 3d, and thus the end of said magnetic core member 31b towards the viewer in the figures is now caused to become a north or N pole while the end of said magnetic core member 31b away from the viewer in the figures is now caused to become a south or S pole, and thus a magnetic flux is induced each exemplary one 33 of the lines of which proceeds out from the upper side surface of said end towards the viewer in the figures of the magnetic core member 31b which is now said north or N pole thereof, through an exemplary one of the magnetic pole teeth on the magnetic pole teeth portion 42c which is closely affixed to said upper side surface, across the relatively narrow gap between said magnetic pole tooth on said magnetic pole portion 42c to an opposing or nearly opposing one of the magnetic pole teeth of the series 51 thereof on the planar movable member 5—thus opposing and at least partially canceling the one of the permanent magnetic flux lines 25 which is passing across said relatively narrow gap in the opposite direction as explained above—along through the planar movable member 5 to another exemplary magnetic pole tooth of said series 51 thereon which opposes or nearly opposes an exemplary one of the magnetic pole teeth on the magnetic pole teeth portion 42d which is closely affixed to the upper side surface of the end away from the viewer in the figures of the magnetic core member 31b which is now the south or S pole thereof, again across the relatively narrow gap between said magnetic pole tooth of said series 51 to said opposing or nearly opposing one of said magnetic pole teeth on said magnetic pole teeth portion 42d— thus reinforcing the one of the permanent magnetic flux lines 25 which is passing across said relatively narrow gap in the same direction as explained above—finally to return to said upper side surface of said end away from the viewer in the figures of said magnetic core member 31b which is now the south or S pole thereof.

Thereby, as a whole, the magnetic flux between the magnetic pole teeth on the magnetic pole teeth portion 42d of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42c of said magnetic pole-plate member 4 and the opposing ones of the magnetic pole teeth of the series 51 thereof on the planar movable member 5 is weakened; and, again, because the connecting portions 44 of the magnetic pole plate member 4 are relatively thin, the magnetic fluxes between the magnetic pole teeth on the magnetic pole teeth portions 42a and 42b of said magnetic pole plate member 4 and the opposing ones of the magnetic pole teeth of the series 51 thereof on the planar movable member 5 are substantially unaffected. Further, again, because the connecting portions 43 of the magnetic pole plate member 4 are also relatively thin, little leakage of the above described magnetic flux lines 33 directly between the two ends of the magnetic core member 31b can occur through them. And, as a result of the above described mutual reinforcement and cancellation of the permanent magnetic flux lines 25 and induced magnetic flux lines 33, a linear force is induced in the direction shown by the arrow "A" in the figure which tends to bring the magnetic pole teeth on said magnetic pole teeth portion 42d of said magnetic pole plate member 4 and the opposing ones of the magnetic pole teeth of the series 51 thereof on the planar movable member 5 together, while on the other hand separating the magnetic pole teeth on said magnetic pole teeth portion 42c of said magnetic pole plate member 4 and the opposing ones of the magnetic pole teeth of the series 51 thereof on the planar movable member 5.

Since the phase difference between the magnetic pole teeth on the magnetic pole teeth portion 42b of the magnetic pole plate member 4 and the magnetic pole teeth on the magnetic pole teeth portion 42d thereof is set, as also explained above, to be P/4, the transition from the state of the apparatus shown by FIG. 3c to the state of the apparatus shown by FIG. 3d proceeds relatively smoothly, and the planar movable member 5 is yet further smoothly propelled along.

And, as will be easily appreciated by one of ordinary skill in the relevant art based upon the disclosure herein, when the state of the apparatus as shown in FIG. 3a is next transitted to, i.e. when from the FIG. 3d operational state the supply of electric current through the coil 32b mounted on the magnetic core member 31b is stopped and an electric current is passed through the other coil 32a mounted on the other magnetic core member 31a in the reverse direction to that utilized in the state of the apparatus shown in FIG. 3c, i.e. in the direction shown in FIG. 3a, then, since the phase difference between the magnetic pole teeth on the magnetic pole teeth portion 42d of the magnetic pole plate member 4 and the magnetic pole teeth on the magnetic pole teeth portion 42a thereof is set, as also explained above, to be P/4, the transition from the state of the apparatus shown in FIG. 3d to the state of the apparatus shown by FIG. 3a proceeds relatively smoothly, and the planar movable member 5 is yet further smoothly propelled along. Thereafter, as the coils 32a and 32b are alternately energized in alternating directions, as for example by a supply of four phase electrical current, the planar movable member 5 is smoothly driven, so as to smoothly move an object attached thereto, for example the magnetic head or heads of a floppy disk drive for a word processor or a portable computer. And, when the motion of the planar movable member 5 is to be reversed, the sequence of such electrical supply to the coils 32a and 32b should be reversed appropriately.

Advantages of the present invention

First, since the magnetic pole plate member 4 can be made by a simple process, such as by pressing, by punch forming, or by etching or the like, which has a high production efficiency, therefore the cost of the planar linear pulse motor of the present invention can be reduced as compared to prior art such pulse motors.

Next, because the four magnetic pole teeth portions 42a though 42d which have teeth formed thereon of precisely mutually adjusted different phases are formed as parts of one unitary body, namely the magnetic pole plate member 4, the work of assembling this planar linear pulse motor of the present invention is made much easier than in the prior art, and high precision of the finished product is made available.

Further, since both the stationary assembly 1 and the planar movable member 5 planar movable member 5 are substantially planar in construction, the planar linear pulse motor of the present invention can be compact and small in overall size, and particularly can be thin in the vertical direction (from the point of view of the figures). This is very beneficial with regard to the intended application of this planar linear pulse motor, which as described above is for driving the movement of the magnetic head or heads in a floppy disk drive of a word processor or a personal computer or the like.

THE SECOND PREFERRED EMBODIMENT

The construction and the functioning of the second preferred embodiment of the planar linear pulse motor of the present invention is shown in perspective view in FIGS. 5a through 5d, with the gap between the stationary assembly 1 and the planar movable member 5 thereof grossly exaggerated, in a similar fashion to the illustrations of the functioning of the first preferred embodiment of the planar linear pulse motor of the present invention shown in FIGS. 3a through 3d and described above. In this figure, parts and gaps and spaces and so on which correspond to analogous parts and gaps and spaces and so on of the first preferred embodiment are denoted by reference numerals like to those utilized in the figures relating to said first preferred embodiment.

Construction

This second preferred embodiment planar linear pulse motor is constructed in a fashion different from, but analogous to, the first preferred embodiment described above. Specifically, the permanent magnet 2 of this second preferred embodiment, rather than extending parallel to the direction of sliding motion of the planar movable member 5, instead extends substantially perpendicular to said sliding motion direction, as will be explained in the following.

Thus, in this second preferred embodiment also, the stationary assembly 1 thereof and the movable member 5 thereof are mounted so as to be mutually slidable as shown by the arrow "A" in the figures. As before, the lower surface (not visible in the figures) of the slidably mounted planar movable member 5 is formed with a series 51 of magnetic pole teeth which are set in series at a pitch of P; and, as before, each of the magnetic pole teeth of this series 51 thereof is continuous from the left side to the right side thereof.

And the stationary assembly 1 comprises a permanent magnet 2 which is again shaped as a rectangular prism, and at each of its ends, only one of which is shown in the figures, this permanent magnet 2 has magnetic poles on opposite side surfaces which are different in polarity but are the same along each said side surface: as before, in the exemplary configuration of the figures, the left side surface of the permanent magnet 2 at its end nearest to the viewer is a north or N pole, while the right side surface of said permanent magnet 2 at its end nearest to the viewer is a south or S pole. And, particularly in this second preferred embodiment of the planar linear pulse motor of the present invention, the permanent magnet 2 extends substantially perpendicular to the direction of sliding motion of the planar movable member 5, i.e. to the direction indicated by the arrow "A" in the figures. A pair of magnetic core members 31a and 31b are provided, each being generally shaped like a letter "C", with central portions thereof denoted respectively as 31c and 31d being narrowed down somewhat. The one end portion designated as 39a in the figures of the one 31a of these magnetic core members is applied against, i.e. is fixed in direct contact with, the left side surface in the figures of the permanent magnet 2 at its end farthest from the viewer which is exemplarily shown as being a north or N pole—for example by being bonded thereto; the other end portion designated as 39b in the figures of said one magnetic core member 31a is applied against, i.e. is likewise fixed in direct contact with, the left side surface in the figures of said permanent magnet 2 at its end closest to the viewer which is also exemplarily shown as being a north or N pole—again, for example by being bonded thereto: the one end portion designated as 39c in the figures of the other one 31b of said magnetic core members is applied against, i.e. is likewise fixed in direct contact with, the right side surface in the figures of said permanent magnet 2 at its end closest to the viewer which is exemplarily shown as being a south or S pole—again, for example by being bonded thereto; and the other end portion designated as 39d in the figures of said other magnetic core member 31b is applied against, i.e. is likewise fixed in direct contact with, the right side surface in the figures of said permanent magnet 2 at its end farthest from the viewer which is also exemplarily shown as being a south or S pole—again, for example by being bonded thereto. And a coil 32a is wound around the narrowed down portion 31c of the magnetic core member 31a, while similarly a coil 32b is wound around the narrowed down portion 31d of the magnetic core member 31b.

In this second preferred embodiment of the planar linear pulse motor of the present invention, there is no particular magnetic pole plate member like the magnetic pole plate member 4 of the first preferred embodiment; instead, the end portions 39a through 39d of the magnetic core members 31a and 31b are respectively formed directly as the magnetic pole teeth portions 42a, 42b, 42c, and 42d, with as before each of the upper surfaces of each of these magnetic pole teeth portions 42a through 42d being formed with a series of magnetic pole teeth 42, with the ones of these magnetic pole teeth 42 arranged along each particular one of said magnetic pole teeth portions 42a through 42d being set in series at the same pitch P. And, as before, the phase of the series of these magnetic pole teeth 42 arranged along the magnetic pole teeth portion 42a is set at a phase difference of P/2 from the phase of the series of the magnetic pole teeth 42 arranged along the magnetic pole teeth portion 42b, with the phase of the series of the magnetic pole teeth 42 arranged along the magnetic pole teeth portion 42c being likewise set at a phase difference of P/2 from the phase of the series of the magnetic pole teeth 42 arranged along the magnetic pole teeth portion 42d, with the phase of the series of the magnetic pole teeth 42 arranged along the magnetic pole teeth portion 42a being set at a phase difference of P/4 from the phase of the series of the magnetic pole teeth 42 arranged along the magnetic pole teeth portion 42d, and with therefore the phase of the series of the magnetic pole teeth 42 arranged along the magnetic pole teeth portion 42b being consequently and likewise set at a like phase difference of P/4 from the phase of the series of the magnetic pole teeth 42 arranged along the magnetic pole teeth portion 42c. In more detail, to consider the phases of the four series of magnetic pole teeth 42 arranged along the four magnetic pole teeth portions 42a, 42c, 42b, and 42d in this specified order, again, each differs from the previous one by a phase difference of P/4, in the same advancing sense.

Operation

This second preferred embodiment of the planar linear pulse motor of the present invention operates as will now be described with reference to FIGS. 5a through 5d. In these figures, as before, the reference numeral 25 denotes the magnetic flux generated by the permanent magnet 2, while the reference numeral 33 denotes magnetic flux generated by one or the other of the magnetic coils 32a or 32b.

First, as shown in all the FIGS. 3a through 3d and by the solid lines shown as 25 which represent the magnetic flux generated by the permanent magnet 2 (again flux lines are herein shown as proceeding from north or N poles to south or S poles), generally the lines of this permanent magnetic flux 25 proceed from the left side in the figures of the permanent magnet 2 which is a north or N pole, into one or the other of the end portions 39a or 39b of the magnetic core member 31a, thence through one or another of the magnetic pole teeth on the magnetic pole teeth portions 42a or 42b respectively affixed to said magnetic core member end portion, across the relatively narrow gap between said magnetic pole tooth on said magnetic pole teeth portion 42a or 42b to an opposing or nearly opposing one of the magnetic pole teeth of the series 51 thereof on the planar movable member 5, along through said magnetic pole tooth of said series 51, again across the relatively narrow gap between said magnetic pole tooth of said series 51 to an opposing or nearly opposing one of the magnetic pole teeth on the magnetic pole teeth portion 42d or 42c respectively, finally to return to the right side in the figures of the permanent magnet 2, which is a south or S pole, via the end portion 39d or 39c of the magnetic core member 31b respectively affixed to said magnetic pole teeth portion. And this general pattern is effective, whatever be the position of the planar movable member 5 relative to the stationary assembly 1.

Referring to the state of the apparatus shown in FIG. 5a, from this state first an electric current is passed through the coil 32b mounted on the magnetic core member 31b in the exemplary direction shown in the figure, and then exemplarily the end of said magnetic core member 31b towards the viewer in the figures is now caused to become a north or N pole while the end of said magnetic core member 31b away from the viewer in the figures is now caused to become a south or S pole, and thus a magnetic flux is induced each exemplary one 33 of the lines of which proceeds out from the upper side surface of said end towards the viewer in the figures of the magnetic core member 31b which is now said north or N pole thereof, through an exemplary one of the magnetic pole teeth on the magnetic pole teeth portion 42c integrally formed on said upper side surface, across the relatively narrow gap between said magnetic pole tooth on said magnetic pole teeth portion 42c to an end of an opposing or nearly opposing one of the magnetic pole teeth of the series 51 thereof on the planar movable member 5—thus opposing and at least partially canceling the one of the permanent magnetic flux lines 25 which is passing across said relatively narrow gap in the opposite direction as explained above—along said exemplary magnetic pole tooth of said series 51 on said planar movable member 5 to the other end thereof which opposes or nearly opposes an exemplary one of the magnetic pole teeth on the magnetic pole teeth portion 42d integrally formed on the upper side surface of the end away from the viewer in the figures of the magnetic core member 31b which is now the south or S pole thereof, again across the relatively narrow gap between said magnetic pole tooth of said series 51 to said opposing or nearly opposing one of said magnetic pole teeth on said magnetic pole teeth portion 42d—thus reinforcing the one of the permanent magnetic flux lines 25 which is passing across said relatively narrow gap in the same direction as explained above—finally to return to said upper side surface of the end away from the viewer in the figures of the magnetic core member 31b which is now the south or S pole thereof.

Thereby, as a whole, the magnetic flux between the magnetic pole teeth on the magnetic pole teeth portion 42d of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42c of said magnetic pole plate member 4 and the opposing ones of the magnetic pole teeth of the series 51 thereof on the planar movable member 5 is weakened. And, as a result of the above described mutual reinforcement and cancellation of the permanent magnetic flux lines 25 and induced magnetic flux lines 33, a linear force is induced in the direction shown by the arrow A in the figure which tends to bring the magnetic pole teeth on said magnetic pole teeth portion 42d of said magnetic pole plate member 4 and the opposing ones of the magnetic pole teeth of the series 51 thereof on the planar movable member 5 together, while on the other hand separating the magnetic pole teeth on said magnetic pole teeth portion 42c of said magnetic pole plate member 4 and the opposing ones of the magnetic pole teeth of the series 51 thereof on the planar movable member 5.

Next, referring to the state of the apparatus shown in FIG. 5b, the supply of electric current through the coil 32b mounted on the magnetic core member 31b is stopped, and an electric current is passed through the other coil 32a mounted on the other magnetic core member 31a in the exemplary direction shown in the figure, and then exemplarily the end of said magnetic core member 31a towards the viewer in the figures is now caused to become a north or N pole while the end of said magnetic core member 31a away from the viewer in the figures is now caused to become a south or S pole, and thus a magnetic flux is induced each exemplary one 33 of the lines of which proceeds out from the upper side surface of said end towards the viewer in the figures of the magnetic core member 31a which is now said north or N pole thereof, through an exemplary one of the magnetic pole teeth on the magnetic pole teeth portion 42b integrally formed on said upper side surface thereof, across the relatively narrow gap between said magnetic pole tooth on said magnetic pole teeth portion 42b to an end of an opposing or nearly opposing one of the magnetic pole teeth of the series 51 thereof on the planar movable member 5—thus reinforcing the one of the permanent magnetic flux lines 25 which is passing across said relatively narrow gap in the same direction as explained above—along said exemplary magnetic pole tooth of said series 51 on said planar movable member 5 to the other end thereof which opposes or nearly opposes an exemplary one of the magnetic pole teeth on the magnetic pole teeth portion 42a integrally formed on the upper side surface of the end towards the viewer in the figures of the magnetic core member 31a which is now the south or S pole thereof, again across the relatively narrow gap between said magnetic pole tooth of said series 51 to said opposing or nearly opposing one of said magnetic pole teeth on said magnetic pole teeth portion 42a—thus opposing and at least partially canceling the one of the permanent magnetic flux lines 25 which is passing across said relatively narrow gap in the opposite direction as explained above—finally to return to said upper side surface of the end away from the viewer in the figures of the magnetic core member 31a which is now the south or S pole thereof.

Thereby, as a whole, the magnetic flux between the magnetic pole teeth on the magnetic pole teeth portion 42b of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42a of said magnetic pole plate member 4 and the opposing ones of the magnetic pole teeth of the series 51 thereof on the planar movable member 5 is weakened. And, as a result of the above described mutual reinformcement and cancellation of the permanent magnetic flux lines 25 and induced magnetic flux lines 33, a linear force is induced in the direction shown by the arrow A in the figure which tends to bring the magnetic pole teeth on said magnetic pole teeth portion 42b of said magnetic pole plate member 4 and the opposing ones of the magnetic pole teeth of the series 51 thereof on the planar movable member 5 together, while on the other hand separating the magnetic pole teeth on said magnetic pole teeth portion 42a of said magnetic pole plate member 4 and the opposing ones of the magnetic pole teeth of the series 51 thereof on the planar movable member 5.

Since the phase difference between the magnetic pole teeth on the magnetic pole teeth portion 42d of the magnetic pole plate member 4 and the magnetic pole teeth on the magnetic pole teeth portion 42b thereof is set, as explained above, to the P/4, the transition from the state of the apparatus shown in FIG. 5a to the state of the apparatus shown by FIG. 5b proceeds relatively smoothly, and the planar movable member 5 is smoothly propelled along.

Next, referring to the state of the apparatus shown in FIG. 5c, the supply of electric current through the coil 32a mounted on the magnetic core member 31a is stopped, and now an electric current is passed through the other coil 32b mounted on the other magnetic core member 31b in the reverse direction to that utilized in the state of the apparatus shown in FIG. 5a, i.e. in the exemplary direction shown in the present FIG. 5c, and thus the end of said magnetic core member 31b towards the viewer in the figures is now caused to become a south or S pole while the end of said magnetic core member 31b away from the viewer in the figures is now caused to become a north or N pole, and thus a magnetic flux is induced each exemplary one 33 of the lines of which proceeds out from the upper side surface of said end away from the viewer in the figures of the magnetic core member 31b which is now said north or N pole thereof, through an exemplary one of the magnetic pole teeth on the magnetic pole teeth portion 42d integrally formed on said upper side surface, across the relatively narrow gap between said magnetic pole tooth on said magnetic pole teeth portion 42d to an opposing or nearly opposing one of the magnetic pole teeth of the series 51 thereof on the planar movable member 5—thus opposing and at least partially canceling the one of the permanent magnetic flux lines 25 which is passing across said relatively narrow gap in the opposite direction as explained above—along said exemplary magnetic pole tooth of said series 51 on said planar movable member 5 to the other end thereof which opposes or nearly opposes an exemplary one of the magnetic pole teeth on the magnetic pole teeth portion 42c integrally formed on the upper side surface of the end towards the viewer in the figures of the magnetic core member 31b which is now the south or S pole thereof, again across the relatively narrow gap between said magnetic pole tooth of said series 51 to said opposing or nearly opposing one of said magnetic pole teeth on said magnetic pole teeth portion 42c—thus reinforcing the one of the permanent magnetic flux lines 25 which is passing across said relatively narrow gap in the same direction as explained above—finally to return to said upper side surface of said end towards the viewer in the figures of said magnetic core member 31b which is now the south or S pole thereof.

Thereby, as a whole, the magnetic flux between the magnetic pole teeth on the magnetic pole teeth portion 42c of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42d of said magnetic pole plate member 4 and the opposing ones of the magnetic pole teeth of the series 51 thereof on the planar movable member 5 is weakended. And, as a result of the above described mutual reinforcement and cancellation of the permanent magnetic flux lines 25 and induced magnetic flux lines 33, a linear force is induced in the direction shown by the arrow A in the figure which tends to bring the magnetic pole teeth on said magnetic pole teeth portion 42c of said magnetic pole plate member 4 and the opposing ones of the magnetic pole teeth of the series 51 thereof on the planar movable member 5 together, while on the other hand separating the magnetic pole teeth on said magnetic pole teeth portion 42d of said magnetic pole plate member 4 and the opposing ones of the magnetic pole teeth of the series 51 thereof on the planar movable member 5.

Since the phase difference between the magnetic pole teeth on the magnetic pole teeth portion 42b of the magnetic pole plate member 4 and the magnetic pole teeth on the magnetic pole teeth portion 42c thereof is set, as also explained above, to be P/4, the transition from the state of the apparatus shown by FIG. 5b to the state of the apparatus shown by FIG. 5c proceeds relatively smoothly, and the planar movable member 5 is further smoothly propelled along.

Finally, referring to the state of the apparatus shown in FIG. 5d, next the supply of electric current through the coil 32b mounted on the magnetic core member 31b is stopped, and now an electric current is passed through the other coil 32a mounted on the other magntic core member 31a in the reverse direction to that utilized in the state of the apparatus shown in FIG. 5b, i.e. in the exemplary direction shown in the present FIG. 5d, and thus the end of said magnetic core member 31a towards the viewer in the figures is now caused to become a south or S pole while the end of said magnetic core member 31a away from the viewer in the figures is now caused to become a north or N pole, and thus a magnetic flux is induced each exmplary one 33 of the lines of which proceeds out from the upper side surface of said end away from the viewer in the figures of the magnetic core member 31a which is now said north or N pole thereof, through an exemplary one of the magnetic pole teeth on the magnetic pole teeth portion 42a integrally formed on said upper side surface, across the relatively narrow gap between said magnetic pole tooth on said magnetic pole teeth portion 42a to an opposing or nearly opposing one of the magnetic pole teeth of the series 51 thereof on the planar movable member 5—thus reinforcing the one of the permanent magnetic flux lines 25 which is passing across said relatively narrow gap in the same direction as explained above—along said exemplary magnetic pole tooth of said series 51 on said planar movable member 5 to the other end thereof which opposes or nearly opposes an exemplary one of the magnetic pole teeth on the magnetic pole teeth portion 42b integrally formed on the upper side surface of the end towards the viewer in the figures of the magnetic core member 31a which is now the south or S pole thereof, again across the relatively narrow gap between said magnetic pole tooth of said series 51 to said opposing or nearly opposing one of said magnetic pole teeth on said magnetic pole teeth portion 42b—thus opposing and at least partially canceling the one of the permanent magnetic flux lines 25 which is passing across said relatively narrow gap in the opposite direction as explained above—finally to return to said upper side surface of said end towards the viewer in the figures of said magnetic core member 31a which is now the south or S pole thereof.

Thereby, as a whole, the magnetic flux between the magnetic pole teeth on the magnetic pole teeth portion 42a of the magnetic pole plate member 4 and the opposing ones of the magnetic pole teeth of the series 51 thereof on the planar movable member 5 is strengthened, while on the other hand the magnetic flux between the magnetic pole teeth on the magnetic pole teeth portion 42b of said magnetic pole plate member 4 and the opposing ones of the magnetic pole teeth of the series 51 thereof on the planar movable member 5 is weakened. And, as a result of the above described mutual reinforcement and cancellation of the permanent magnetic flux lines 25 and induced magnetic flux lines 33, a linear force is induced in the direction shown by the arrow A in the figure which tends to bring the magnetic pole teeth on said magnetic pole teeth portion 42a of said magnetic pole plate member 4 and the opposing ones of the magnetic pole teeth of the series 51 thereof on the planar movable member 5 together, while on the other hand separating the magnetic pole teeth on said magnetic pole teeth portion 42b of said magnetic pole plate member 4 and the opposing ones of the magnetic pole teeth of the series 51 thereof on the planar movable member 5.

Since the phase difference between the magnetic pole teeth on the magnetic pole teeth portion 42c of the magnetic pole plate member 4 and the magnetic pole teeth on the magnetic pole teeth portion 42a thereof is set, as also explained above, to be P/4, the transition from the state of the apparatus shown by FIG. 5c to the state of the apparatus shown by FIG. 5d proceeds relatively smoothly, and the planar movable member 5 is yet further smoothly propelled along.

And, as will be easily appreciated by one of ordinary skill in the relevant art based upon the disclosure herein, when the state of the apparatus as shown in FIG. 5a is next transitted to, i.e. when from the FIG. 5d operational state the supply of electric current through the coil 32a mounted on the magnetic core member 31a is stopped and an electric current is passed through the other coil 32b mounted on the other magnetic core member 31b in the reverse direction to that utilized in the state of the apparatus shown in FIG. 5c, i.e. in the direction shown in FIG. 5a, then, since the phase difference between the magnetic pole teeth on the magnetic pole teeth portion 42a of the magnetic pole plate member 4 and the magnetic pole teeth on the magnetic pole teeth portion 42d thereof is set, as also explained above, to be P/4, the transition from the state of the apparatus shown by FIG. 5d to the state of the apparatus shown by FIG. 5a proceeds relatively smoothly, and the planar movable member 5 is yet further smoothly propelled along. Thereafter, as the coils 32a and 32b are alternately energized in alternating directions, as for example by a supply of four phase electrical current, the planar movable member 5 is smoothly driven, so as to smoothly move an object attached thereto, for example the magnetic head or heads of a floppy disk drive for a word processor or a portable computer. And, when the motion of the planar movable member 5 is to be reversed, the sequence of such electrical supply to the coils 32a and 32b should be reversed appropriately.

The same functions and advantages are available with this second preferred embodiment of the planar linear pulse motor of the present invention, as were available with the second preferred embodiment, and accordingly detailed description thereof will be eschewed in the interests of brevity of explanation. However, it should be particularly noted that, because in this second preferred embodiment the permanent magnet 2, rather than extending parallel to the direction of sliding motion of the planar movable member 5, instead extends substantially perpendicular to said sliding motion direction, thereby the construction is made more compact and thinner, and accordingly its suitability for application to a floppy disk drive for a word processor or a portable computer is increased.

In detail, in FIG. 6 there is shown the application of this second preferred embodiment of the planar linear pulse motor of the present invention to a floppy disk drive for a word processor or a portable computer. This figure should be contrasted with FIG. 9, the explanation of which was provided in the portion of this specification entitled "Background of the Invention"; the same reference numerals are used for the same or corresponding parts in the two figures. The magnetic head 117 is again supported from the planar movable member 5 of the planar linear pulse motor by way of the mount 118, and moves to and fro over the floppy disk 120 for reading it as the planar linear pulse motor operates. In this case, since the magnetic core members 31a and 31b can be directly mounted against the base 119 on which the device is mounted, the overall thickness (or height H from the point of view of the figure) of said planar linear pulse motor from said base 119 to the floppy disk 120 inserted into the floppy disk drive is much reduced over the thickness of the FIG. 9 construction. Accordingly, low profile design of such a floppy disk drive is well nigh impossible when such a planar linear pulse motor is to be incorporated therein, since the pulse motor itself is relatively thick.

THE THIRD PREFERRED EMBODIMENT

The third preferred embodiment of the planar linear pulse motor of the present invention is shown in FIG. 7, in a similar manner to FIG. 5a etc. for the second preferred embodiment. In this figure, parts and gaps and spaces and so on which correspond to analogous parts and gaps and spaces and so on of the second preferred embodiment are denoted by reference numerals like to those utilized in the figures relating to said second preferred embodiment. This third preferred embodiment is constructed somewhat differently, in that the magnetic core members 31, while still being formed as letter "C" shapes, are differently proportioned and aligned, with the coil 32a being wound in two separate parts around the end portions 39a and 39b of the magnetic core member 31a, and with the coil 32b each being wound in two separate parts around the end portions 39c and 39d of the magnetic core member 31b, as shown in the figure. It will be understood by one of ordinary skill in the relevant art, based upon the descriptions herein, how this third preferred embodiment functions; and it will thus be apparent that the same functions and advantages are available with this third preferred embodiment of the planar linear pulse motor of the present invention, as were available with the first and the second preferred embodiments. Accordingly, detailed description thereof will be foregone in the interests of brevity of disclosure. Suffice it to mention that, in this third preferred embodiment, since the coils 32a and 32b are wound directly around the end portions 39a through 39d of the magnetic core members 31a and 31b which support the magnetic pole teeth portions 42a through 42d, the magnetic efficiency is higher, than in the cases of the previous embodiments in which said coils 32a and 32b were wound around the central portions of said magnetic core members 31a and 31b.

THE FOURTH PREFERRED EMBODIMENT

The above described preferred embodiments have all been quite effective, but they still have been found in practice to suffer from the problem of manufacturing efficiency that has not been quite as high as ideal, accordingly causing unduly high production cost; and also they have suffered from the problem that it is very difficult, for the purpose of setting the magnetic gap width which should be of the order of microns, to machine and to assemble the various component parts which make up the stationary assembly 1. Further, the magnetic flux tends to leak from the various bonded interfaces within said stationary assembly 1, which makes for poor magnetic efficiency. Accordingly the fourth preferred embodiment of the planar linear pulse motor of the present invention was developed.

This fourth preferred embodiment of the planar linear pulse motor of the present invention is shown in FIG. 10, in a schematic view similar to FIGS. 5a through 5d which related to the second preferred embodiment (among others). In this figure, parts and gaps and spaces and so on which correspond to analogous parts and gaps and spaces and so on of the previously described preferred embodiments are denoted by reference numerals like to those utilized in the figures relating to said previously described preferred embodiments.

In this fourth preferred embodiment, the construction is similar in overall concept to those of the second and the third preferred embodiments, with the difference is that the magnetic core members 31a and 31b with their narrowed down central portions 31c and 31d and their end portions 39a through 39d, and the magnetic pole teeth portions 42a through 42d thereon, rather than being provided as separate members fitted to either side of the permanent magnet 2 as was the case in the previously described preferred embodiments, instead are provided as one integrally formed member within which the permanent magnet 2 is fitted. In detail, a single member 20, typically formed of relatively soft magnetic metal, is provided which is formed into said magnetic core structures by being formed with a magnet receiving slot 21 across its central portion extending generally perpendicularly to the direction of motion of the planar movable member 5, which is similar to that utilized with regard to the second or the third preferred embodiment. This slot 21 crosses a letter "H" shaped slot hole 22 formed in the central portion of the magnetic metal member 20, substantially bisecting its central cross bar portion substantially at right angles. Thereby magnetic core member portions 31a and 31b are defined functionally substantially identical to those of the second preferred embodiment, for example. And the magnetic pole teeth portions 42a through 42d are directly formed by etching or press forming or stamping or some other matching process or the like on the portions of the magnetic metal member 20 above and below the aforementioned central cross bar portion of the "H" shaped slot hole 22 cut therein, on either side of the magnet receiving slot 21. And in said magnet receiving slot 21 there is tightly fitted a permanent magnet 2, similar to the permanent magnet 2 utilized in the second preferred embodiment; alternatively, this permanent magnet 2, rather than being for example made of sintered metal, could be a composite type of permanent magnet which is made by filling material to be molded into the magnet receiving slot 21, said material to be molded including magnetic powder and synthetic resin mixed well together, as for example by molding, and then by magnetizing said material to be molded so that it should have its north or N and its south or S poles along its two side surfaces, as shown in the figure. In this case, the efficiency of contacting between the permanent magnet 2 and the magnetic metal member 20 is extremely high, and accordingly the magnetic efficiency is also extremely high, and magnetic leakage is thoroughly prevented.

And the coils 32a and 32b can be wound onto the intermediate portions 31c and 31d of the magnetic core members 31a and 31b by the use of a troidal winding machine, or the like.

The functioning of this fourth preferred embodiment of the planar linear pulse motor of the present invention is substantially identical to that of the second preferred embodiment planar linear pulse motor described above, and accordingly detailed description thereof will be omitted in the interests of conciseness of disclosure.

One advantage of this fourth preferred embodiment is that, since the magnetic core members 31a and 31b with their narrowed down central portions 31c and 31d and their end portions 39a through 39d and the magnetic pole teeth portions 42a through 42d thereon are provided as different portions of one integrally formed member within which the permanent magnet 2 is tightly fitted, rather than being provided as separate members abuttingly fitted to either side of the permanent magnet 2 as was the case in the previously described preferred embodiments, therefore the manufacturing and assembling efficiency can be greatly increased and the cost of production can be drastically reduced. Also, the accuracy of production of these various parts, and their mutual alignment and positioning during assembly, are much simplified. Another advantage is that the problem of leakage of magnetic flux, which in other non integral type constructions is a major problem, is avoided, and the magnetic efficiency of the planar linear pulse motor can thus be dramatically improved. Further, as a consequence of this unitary type construction, the thickness of the stationary assembly 1 as a whole can be further reduced, and thus the planar linear pulse motor can be manufactured as even more thin than before. And the overall structure has been simplified so as to contribute to compactness of overall design in an advantageous manner.

THE FIFTH PREFERRED EMBODIMENT

The fifth preferred embodiment of the planar linear pulse motor of the present invention is shown in FIG. 10, in a schematic view similar to FIGS. 3a through 3d which related to the first preferred embodiment (among others). In this figure, parts and gaps and spaces and so on which correspond to analogous parts and gaps and spaces and so on of the first preferred embodiment are denoted by reference numerals like to those utilized in the figures relating to said first preferred embodiment.

In this fifth preferred embodiment, the construction is similar in overall concept to that of the first preferred embodiment, with the same differences therefrom as characterized the fourth preferred embodiment over the second. That is to say, the overall layout is that of the first preferred embodiment, with the constructional concept of the fourth preferred embodiment, i.e. that the magnetic core members 31a and 31b with their narrowed down central portions 31c and 31d and their end portions 39a through 39d, and the magnetic pole teeth portions 42a through 42d thereon, rather than being provided as separate members fitted to either side of the permanent magnet 2 as was the case in the first preferred embodiment, instead are provided as one integrally formed single member 20 within which the permanent magnet 2 is fitted. In detail, this single member 20, again typically formed of relatively soft magnetic metal, is provided which is formed into said magnetic core structures by being formed with a magnet receiving slot 21 across its central portion extending generally, now, parallel to the direction of motion of the planar movable member 5, which is similar to that utilized with regard to the previously described preferred embodiments. This slot 21 crosses a letter "H" shaped slot hole 22 formed in the central portion of the magnetic metal member 20, again substantially bisecting its central cross bar portion substantially at right angles. Thereby magnetic core member portions 31a and 31b are defined functionally substantially identical to those of the first preferred embodiment. And the magnetic pole teeth portions 42a through 42d are again directly formed by etching or press forming or stamping or some other machining process or the like on the portions of the magnetic metal member 20 above and below the aforementioned central cross bar portion of the "H" shaped slot hole 22 cut therein, on either side of the magnet receiving slot 21. And in said magnet receiving slot 21 there is tightly fitted a permanent magnet 2, similarly to the fitting of the permanent magnet 2 utilized in the fourth preferred embodiment. And the coils 32a and 32b can be wound onto the intermediate portions 31c and 31d of the magnetic core members 31a and 31b by the use of a troidal winding machine, or the like.

The functioning of this fifth preferred embodiment of the planar linear pulse motor of the present invention is substantially identical to that of the first preferred embodiment planar linear pulse motor described above, and accordingly detailed description thereof will be omitted in the interests of conciseness of disclosure. Also, the advantages and benefits of this fifth preferred embodiment are substantially similar to those of the fourth preferred embodiment, and accordingly protracted recitation thereof will be eschewed.

THE SIXTH PREFERRED EMBODIMENT

The sixth preferred embodiment of the planar linear pulse motor of the present invention is shown in FIG. 12 in a schematic view similar to FIG. 11 which related to the fifth preferred embodiment; except that this sixth preferred embodiment of the planar linear pulse motor of the present invention includes a sliding mounting construction for the planar movable member 5, and in this FIG. 12 said planar movable member 5 is shown as lifted off from the stationary assembly 1 and from said sliding mounting construction for the convenience of illustration. And FIG. 13 shows an exploded view of this sixth preferred embodiment planar linear pulse motor, while FIG. 14 is a schematic plan view showing an exemplary application of said sixth preferred embodiment to a floppy disk drive of a word processor or a personal computer or the like. In these figures, parts and gaps and spaces and so on of the previously described preferred embodiments are denoted by reference numerals like to those utilized in the figures relating to said previously described preferred embodiments.

In this sixth preferred embodiment, the construction is somewhat different, and additional means are incorporated as portions of the construction. In detail, said sixth preferred embodiment of the planar linear pulse motor of the present invention, as shown in exploded perspective view in FIG. 13, as before comprises a stationary assembly 1 and a planar movable member 5, slidably mounted with respect to the stationary assembly 1 as shown by the arrow "A" in the figures. And the stationary assembly 1, as best seen in the exploded view thereof presented in FIG. 13, comprises a permanent magnet 2 which is shaped as a rectangular prism, with as before magnetic poles on its opposite side surfaces which are different in polarity but are the same along each said side surface. In this sixth preferred embodiment of the planar linear pulse motor of the present invention, as in the first preferred embodiment, the permanent magnet 2 extends in the direction of sliding motion of the planar movable member 5. Each of the magnetic core members 31a and 31b of the previous embodiments is structured as an assembly comprising two yoke members and a coil core: in detail, the magnetic core assembly 31a is again generally shaped like a letter "C", and comprises a first yoke member 64a, a second yoke member 64b, and a coil core 62a. Similarly, the other magnetic core assembly 31b is again generally shaped like a letter "C", and comprises a third yoke member 64c, a fourth yoke member 64d, and a coil core 62b. The inner end portions designated as 39a through 39d in the figures of these magnetic core assemblies 31a and 31b are applied against, i.e. are fixed in direct contact with, the left and the right side surfaces in the figures of the permanent magnet 2. And a coil 63a is wound around a spool 65a fitted over the coil core 62a of the the magnetic core assembly 31a, while similarly a coil 63b is wound around a spool 65b fitted over the coil core 62b of the other magnetic core assembly 31b. And a magnetic pole plate member 4 is provided, like to the magnetic pole plate member 4 of the first preferred embodiment, fixed, as for example by being bonded, across the upper surfaces in the figure of the end portions 39a through 39d of the yoke members 64a through 64d of the magnetic core assemblies 31a and 31b, so as to be securely held relatively closely to said upper surfaces of said end portions 39a through 39d, so as to allow relatively easy passage of magnetic flux between itself and them. The upper surfaces of this magnetic pole plate member 4 is formed with four magnetic pole teeth portions 42a through 42d, each of which as before is formed with a series of magnetic pole teeth 42, with the phases thereof differing by a phase difference of one quarter of the pitch of a series of teeth 51 which are formed on the planar movable member 5, as before. This planar movable member 5 is slidably mounted, by a linear bearing type construction which will be described shortly, so as to be movable with respect to the stationary assembly 1 to and fro in the direction shown by an arrow "A" in the figures, and so that the teeth series 51 on its lower surface opposes the magnetic pole teeth on the magnetic pole teeth portions 42a through 42d with a relatively small gap, typically about 50 microns, being left therebetween. And the basic functioning of this sixth preferred embodiment of the planar linear pulse motor of the present invention with regard to driving the planar movable member 5 to and fro with respect to the stationary assembly 1 according to supply of electrical energy to the coils 65a and 65b in one or the other direction is isomorphic to the functioning of the first preferred embodiment, and hence will not be further discussed herein in view of the desirability of brevity of explanation.

The permanent magnet 2 and these four yoke members 64a through 64d are together mounted to a base designated in the figures as 200, which may for example be formed of a pressed plate. In detail, this base member 200 is generally rectangular in shape, and has four walls designated as 201, 202, 203, and 204 extending upwards from it and defining a generally rectangular shape, said walls 201, 202, 203, and 204 being formed by pulling up tab shaped cutaway portions of said base member 200. First, the permanent magnet 2 is fixed to the base member 200 in a central position thereon, and then the paired yoke members 64a through 64d are set into place two on either side of said permanent magnet 2, between the sides of said permanent magnet 2 and the corresponding one of the walls 201 and 202, and clamped in the longitudinal direction by the walls 203 and 204. Thereby, said yoke members 64a through 64d are securely and positively held in predetermined positions by the provision of these walls 201, 202, 203, and 204 as surrounding them. Then the magnetic pole plate member 4 is secured over the yoke members 64a through 64d as already explained. And the base member 200 is further formed with two ear portions pierced with two holes 210a and 210b for location and mounting of this planar linear pulse motor as will be explained hereinafter, and with two turned up lugs 211 and 212 for mounting of a biasing spring 213, as also will be explained hereinafter.

This shown and disclosed sixth preferred embodiment of the planar linear pulse motor of the present invention has four support walls 201, 202, 203, and 204 formed on its base member 200 as described above, but in alternative constructions various other numbers of such support walls could be utilized; and it is also possible optionally to connect one or more of said support walls to one or more of the yoke members 64a through 64d, as for example by welding, so that the rigidity of the planar linear pulse motor as a whole can be increased.

The linear bearing type construction for mounting the planar movable member 5 to the stationary assembly 1 so that it is slidable with respect thereto to and fro in the direction shown by the arrow "A" in the figures will now be explained. It comprises two rail mechanisms, denoted respectively as 70 and 80 in the figures, which oppose one another on opposite sides of the stationary assembly 1. The rail mechanism 70 comprises a retainer member 71 formed with a cross section like a letter "L", and thus this retainer member 71 has a horizontal floor portion 72 and a vertical wall portion 73. The floor portion 72 is formed with a plurality of rectangular through holes—two in the shown sixth preferred embodiment—denoted as 74, and each of said holes 74 has a roller 75 fitted in it, said rollers 75 thus being retained in position by the retainer member 71 and rolling on the upper surfaces of the yoke members 64a and 64b. And the vertical wall portion 73 of the retainer member 71 is formed with two notches—two in the shown sixth preferred embodiment—denoted as 76, and each of said notches 76 has a ball 77 fitted in it, said balls 77 thus being retained in position by the retainer member 71. And this rail mechanism 70 further comprises a backing rail 313 which also is formed with a cross section like a letter "L", and a vertical wall portion of said rail 313 backs up said balls 77 which therefore roll thereon.

Similarly, the other rail mechanism 80 likewise comprises a retainer member 81 formed with a cross section like a letter "L", and thus this retainer member 81 also has a horizontal floor portion 82 and a vertical wall portion 83. The floor portion 82 is formed with a plurality of rectangular through holes—two in the shown sixth preferred embodiment—denoted as 84, which are not visible in the figures, and each of said holes 84 has a roller 85 (not visible either) fitted in it, said rollers 85 thus being retained in position by the retainer member 81 and rolling on the upper surfaces of the yoke members 64c and 64d. And the vertical wall portion 83 of the retainer member 81 is formed with two notches—two in the shown sixth preferred embodiment—denoted as 86, and each of said notches 86 has a ball 87 (these are not actually shown in the figure) fitted in it, said balls 87 thus being retained in position by the retainer member 81. And this rail mechanism 80 further comprises a pressure rail 313 which also is formed with a cross section like a letter "L", and a vertical wall portion of said rail 313 backs up said balls 87 which therefore roll thereon.

The planar movable member 5 is located between the rail mechanisms 70 and 80 and its side surfaces roll on the balls 77 and 87, while the edges of its lower surface as seen in the figure roll on the rollers 75 and 85. The backing rail 313 of the rail mechanism 70 is securely fixed to the upper sides of the yoke members 64a and 64b, as for example by being welded, and is somewhat longer by comparison with the pressure rail 314 of the other rail mechanism 80, which is rested on the upper sides of the other two yoke members 64a and 64b, and is biased towards the backing rail 313, i.e. towards the planar movable member 5, by the pushing action received from one free end portion of a biasing torsion coil spring 213 the central coil portion of which is fitted over the spring mounting lug projection 212 of the base member 200, said spring 213 being maintained in a state of torsion by its other free end portion being pressed against the spring biasing lug projection 211 of said base member 200. Thus, the rollers 75 and 85 serve for precisely defining the gap (as mentioned before of about 50 microns) between the planar movable member 5 and the stationary assembly 1 and for supporting said planar movable member 5 in the vertical direction, while the balls 77 and 87 serve for locating and supporting the planar movable member 5 with regard to wobbling thereof in the horizontal direction. And on each of the retainer members 71 and 81 there are formed inwardly projecting stopper portions 78 and 88 respectively, which prevent motion of the planar movable member 5 in either direction past certain determinate extreme positions thereof by engaging with the teeth 51 formed on the underside in the figures of said planar movable member 5.

The somewhat longer backing rail 313 of the rail mechanism 70 projects at its ends 422 and 423 as extensions out past the base member 200. When this sixth preferred embodiment of the planar linear pulse motor of the present invention is to be mounted to an apparatus, for example to a floppy disk drive of a word processor or a personal computer or the like for driving the movement of the magnetic head or heads thereof as exemplarily shown in FIG. 14, then it is appropriate for the body 500 of said exemplary floppy disk drive to be provided with two positioning projections 450, so arranged that, when the head or heads denoted as 460 of said floppy disk drive are mounted to the planar movable member 5 of this planar linear pulse motor so as to be linearly driven thereby, and when the extensions 422 and 423 of the backing rail 313 of the rail mechanism 70 are positioned against said positioning projections 450 and are clamped thereto as for example by screws, the line of motion denoted as "f" of said head or heads 460 intersects the rotational axis denoted as "P" of a floppy disk 470 fitted in this floppy disk drive. This provides a reliable and secure means for easily positioning this planar linear pulse motor in the floppy disk drive, without any requirement for the use of a jig or the like during assembly thereof, and accordingly makes the assembly work for such a floppy disk drive much easier and reduces the overall manufacturing cost thereof. And precision in the machining accuracy of the backing rail 313 of the rail mechanism 70 is effective both for improving the accuracy of positioning of the planar movable member 5 relative to the stationary assembly 1 and also for improving the accuracy of positioning of the planar linear pulse motor as a whole relative to the device to which it is to be fitted, thereby advantageously accomplishing two independent results at once as a result of the performance of a single act of care in manufacture. After this positioning of the planar linear pulse motor as a whole relative to the device to which it is to be fitted as described above, it may then be securely fixed in place by being bolted down by bolts (not particularly shown) passed through the two holes 210a and 210b formed through the aforementioned two ear portions of said base member 200 thereof.

Further, a means for detecting the position of the planar movable member 5 relative to the stationary assembly 1 is provided, as will now be explained. On the upper surface of the edge in FIG. 13 towards the viewer of the base member 200 there is fixed a light emitting and receiving unit denoted as 101, which lies approximately, in this sixth preferred embodiment of the planar linear pulse motor of the present invention, on the mid line of the planar movable member 5 as it is slidably mounted on the stationary assembly 1. This light emitting and receiving unit 101 comprises a light emitting unit 103 and a light receiving unit 104 which oppose one another across a gap 102, substantially perpendicularly to the direction of motion of the planar movable member 5 relative to the stationary assembly 1. The light emitting unit 103, during use of this planar linear pulse motor as for example in a floppy disk drive as exemplarily illustrated in FIG. 14, emits a beam of electromagnetic radiation towards the light receiving unit 104, which, if and only if said electromagnetic radiation beam is not interrupted, receives it and generates an output electrical signal. And to the planar movable member 5, approximately in its central end edge portion in this sixth preferred embodiment, there is mounted a light interrupting plate 101 which extends in the downward direction as seen in the figure. When the planar movable member 5 is at a certain extreme position at the end of its travel relative to the stationary assembly 1, then this light interrupting plate 101 passes into the gap 102 and interrupts the aforementioned electromagnetic radiation beam from the light emitting unit 103 to the light receiving unit 104, thus causing the interruption of the output signal from said light receiving unit 104; but, when said planar movable member 5 is at any other position in its travel relative to said stationary assembly 1, then said light interrupting plate 101 does not pass into the gap 102 and accordingly does not interrupt the aforementioned electromagnetic radiation beam from the light emitting unit 103 to the light receiving unit 104, thus not causing the interruption of the output signal from said light receiving unit 104 and allowing said output signal to continue. Accordingly, by whether said output signal from said light receiving unit 104 is present or not, it is possible to detect whether or not said planar movable member 5 is at its said extreme position at the end of its travel relative to the stationary assembly 1, or not. The output of the light receiving unit 104 may conveniently be sent to a circuit such as a Schmitt circuit such as the one exemplarily shown in FIG. 15 for providing ON/OFF control by detecting the extreme point of the travel of said planar movable member 5. The exemplary constitution is illustrated in which the normal output is ON when the planar movable member 5 is at a point of its travel other than said extreme point thereof, and in which the output is OFF when said planar movable member 5 is at said extreme point of its travel; and it is possible to reverse this relationship by the use of an inversion circuit, for example.

Thus, in the exemplary case of the utilization of this planar linear pulse motor as in a floppy disk drive as exemplarily illustrated in FIG. 14, with the magnetic head or heads 460 attached via a support member or members (not particularly shown) to the planar movable member 5: when said planar movable member 5 is within its normal operating range and not at said end point of its travel, then the light interrupting plate 101 does not pass into the gap 102 and accordingly does not interrupt the electromagnetic radiation beam from the light emitting unit 103 to the light receiving unit 104, thus not causing the interruption of the output signal from said light receiving unit 104 and allowing said output signal to continue. On the other hand, when said planar movable member 5 is at said end point of its travel which it reaches after a certain number n of steps, then the light interrupting plate 101 passes into said gap 102 and accordingly interrupts said electromagnetic radiation beam from said light emitting unit 103 to said light receiving unit 104, thus interrupting the output signal from said light receiving unit 104 and causing the output signal thereof to be stopped, as schematically illustrated in the FIG. 16 graph. The fact that said planar movable member 5 is at said end point of its travel is accordingly detected by ON/OFF controlling the output of the light receiving unit 104 with the Schmitt circuit of FIG. 15.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A planar linear pulse motor, comprising first and second assemblies which are mutually movable along an axial line;
    said first assembly comprising a group of magnetic pole teeth, said magnetic pole teeth being arranged at a determinate pitch in a row along a line substantially parallel to said axial line, and each said magnetic pole tooth being elongated in a direction substantially perpendicular to said axial line;
    and said second assembly comprising:
    a magnetic pole plate member having four groups of magnetic pole teeth, each said group being arranged substantially at said determinate pitch in a row along a line substantially parallel to said axial line, with the phases of said four groups of magnetic pole teeth being substantially offset from one another, and each said magnetic pole tooth being elongated in a direction substantially perpendicular to said axial line; said four groups of magnetic pole teeth of said second assembly each substantially confronting said group of magnetic pole teeth of said first assembly in a substantially parallel relationship with a relatively small gap being present therebetween;
    a permanent magnet having opposite magnetic poles on its side surfaces on either side of a central longitudinal line thereof, said central line being parallel to said axial line;
    a pair of generally C-shaped magnetic core members, one of which is touching to one said magnetic pole side surface of said permanent magnet and the other of which is touching to the other said magnetic pole side surface of said permanent magnet so that said two magnetic core members and said permanent magnet are generally coplanar, said magnetic core members being fixed directly to said magnetic pole plate member so that each magnetic core member has two pole surfaces contiguous to two of said groups of magnet pole teeth of the magnetic pole plate member; and
    for each of said magnetic core members, a means for inducing magnetic flux therein.

2. A planar pulse motor according to claim 1, wherein the phases of said four groups of magnetic pole teeth of said second assembly are mutually offset from one another by an amount which is substantially a quarter of said determinate pitch.

3. A planar linear pulse motor according to claim 1, wherein said magnetic pole plate member comprises strip portions which integrally join together said four groups of magnetic pole teeth.

4. A planar linear pulse motor according to claim 3, wherein said magnetic pole plate member is formed generally in a hollow rectangular shape, with said four groups of magnetic pole teeth being located at its four corners and said strip portions being integrally joined to said four groups of magnetic pole teeth and extending along its edges.

5. A planar linear pulse motor according to claim 1, wherein said four groups of magnetic pole teeth of said second assembly are fixed in pairs on said two magnetic core members generally beside where said two magnetic core members are touching said magnetic pole side surfaces of said permanent magnet.

6. A planar linear pulse motor according to claim 1, wherein said permanent magnet extends substantially perpendicular to said axial line.

7. A planar linear pulse motor according to claim 1, wherein said means for inducing magnetic flux in each of said magnetic core members comprises a coil wound around the central portion of said magnetic core member.

8. A planar linear pulse motor according to claim 1, wherein said means for inducing magnetic flux in each of said magnetic core members comprises two coils, one being wound around a portion of said magnetic core member proximate to one of its said pole surfaces contiguous to one of said groups of magnetic pole teeth of said second assembly corresponding to this magnetic core member, and the other being wound around a portion of said magnetic core member proximate to the other of its said pole surfaces contiguous to the other of said groups of magnetic pole teeth of said second assembly corresponding to this magnetic core member.

9. A planar linear pulse motor according to claim 1, wherein said pair of magnetic core members and said four groups of magnetic pole teeth of said second assembly are all formed as portions of one unitary member.

10. A planar linear pulse motor according to claim 9, wherein said unitary member is formed of magnetic metal.

11. A planar linear pulse motor according to claim 9, wherein said permanent magnet of said second assembly is tightly fitted into a slot formed in said unitary member.

12. A planar linear pulse motor according to claim 9, wherein said permanent magnet of said second assembly is molded into a slot formed in said unitary member.

13. A planar linear pulse motor according to claim 1, wherein said second assembly comprises a base member and a support wall rising up therefrom, said four groups of magnetic pole teeth being supported on either side of said permanent magnet on said base against said support wall.

14. A planar linear pulse motor according to claim 13, wherein said support wall is integrally formed with said base as a bent up tab portion thereof.

15. A planar linear pulse motor according to claim 13, wherein said base is formed with an extension adapted for mounting said planar linear pulse motor to another object.

16. A planar linear pulse motor according to claim 13, further comprising a means for biasing said four groups of magnetic pole teeth and said permanent magnet against said support wall.

17. A planar linear pulse motor according to claim 16, wherein said biasing means is a spring.

18. A planar linear pulse motor according to claim 17, wherein said base is formed with a spring mounting portion for supporting said spring.

19. A planar linear pulse motor according to claim 1, further comprising a means for mutually supporting said first and said second assembly with respect to one another so that they are mutually movable along said axial line, wherein said supporting means further comprises a means for positioning said planar linear pulse motor with respect to an element to which it is to be fitted.

20. A planar linear pulse motor according to claim 19, wherein said supporting means comprises a rail along which said first assembly slides; said positioning means comprising an extension of said rail.

21. A planar linear pulse motor according to claim 20, wherein said rail is extended at both its ends, which are both comprised in said positioning means.

22. A planar linear pulse motor according to claim 1, further comprising a means for detecting the position of said first assembly with respect to said second assembly.

23. A planar linear pulse motor according to claim 22, wherein said position detecting means comprises: a electromagnetic radiation shielding element fitted to said first assembly; and a electromagnetic radiation emitting element and a electromagnetic radiation receiving element fitted to said second assembly; said electromagnetic radiation shielding element, when said first assembly is in a determinate position with respect to said second assembly, interrupting electromagnetic radiation passing from said electromagnetic radiation emitting element to said electromagnetic radiation receiving element; but said electromagnetic radiation shielding element, when on the other hand said first assembly is not in said determinate position with respect to said second assembly, not thus interrupting electromagnetic radiation passing from said electromagnetic radiation emitting element to said electromagnetic radiation receiving element.

24. A planar linear pulse motor, comprising first and second assemblies which are mutually movable along an axial line;

said first assembly comprising a group of magnetic pole teeth, said magnetic pole teeth being arranged at a determinate pitch in a row along a line substantially parallel to said axial line, and each said magnetic pole tooth being elongated in a direction substantially perpendicular to said axial line;

and said second assembly comprising:

a magnetic pole plate member having four groups of magnetic pole teeth, each said group being arranged substantially at said determinate pitch in a row along a line substantially parallel to said axial line, with the phases of said four groups of magnetic pole teeth being substantially offset from one another, and each said magnetic pole tooth being elongated in a direction substantially perpendicular to said axial line; said four groups of magnetic pole teeth of said second assembly each substantially confronting said group of magnetic pole teeth of said first assembly in a substantially parallel relationship with a relatively small gap being present therebetween;

a permanent magnet having opposite magnetic poles on its side surfaces on either side of a central longitudinal line thereof, said central line being parallel to said axial line;

a pair of magnetic core members, one of which is contiguous to one said magnetic pole side surface of said permanent magnet and the other of which is contiguous to the other said magnetic pole side surface of said permanent magnet so that said two magnetic core members and said permanent magnet are generally coplanar, said magnetic core members being fixed directly to said magnetic pole plate member so that each magnetic core member has two pole surfaces contiguous to two of said groups of magnet pole teeth of the magnetic pole plate member; and for each of said magnetic core members, a means for inducing magnetic flux therein;

wherein said magnetic pole plate member comprises a cut out hole which is contiguous with an upper surface of said permanent magnet.

* * * * *